United States Patent

Narita et al.

[11] Patent Number: 6,157,884
[45] Date of Patent: Dec. 5, 2000

[54] SPEED RATIO CONTROL DEVICE AND CONTROL METHOD FOR AUTOMATIC TRANSMISSION

[75] Inventors: Yasushi Narita; Satoshi Takizawa, both of Yokohama; Yuusuke Minagawa, Yokosuka; Masato Koga, Atsugi; Mitsuru Watanabe, Hadano, all of Japan

[73] Assignee: Nissan Motor Co., Ltd., Yokohama, Japan

[21] Appl. No.: 09/401,962

[22] Filed: Sep. 22, 1999

[30] Foreign Application Priority Data

| Sep. 25, 1998 | [JP] | Japan | 10-271191 |
| Sep. 25, 1998 | [JP] | Japan | 10-271192 |
| Sep. 25, 1998 | [JP] | Japan | 10-271193 |
| Sep. 25, 1998 | [JP] | Japan | 10-271194 |
| Sep. 25, 1998 | [JP] | Japan | 10-271195 |
| Sep. 25, 1998 | [JP] | Japan | 10-271196 |

[51] Int. Cl.[7] .............................................. F16H 35/00
[52] U.S. Cl. ........................ 701/51; 701/70; 701/60; 701/61; 477/49; 477/34; 477/46; 477/68; 477/85
[58] Field of Search ........................... 701/51, 60, 61, 701/70; 477/34, 46, 49, 68, 78, 85

[56] References Cited

U.S. PATENT DOCUMENTS

| 4,827,803 | 5/1989 | Miyawaki | 477/49 |
| 5,009,129 | 4/1991 | Morimoto et al. | 477/49 |
| 5,803,862 | 9/1998 | Ochiai et al. | 477/45 |
| 5,820,514 | 10/1998 | Adachi | 477/46 |
| 5,842,948 | 12/1998 | Yuasa et al. | 477/48 |
| 5,931,884 | 8/1999 | Ochiai . | |
| 5,983,152 | 11/1999 | Genzel et al. | 701/51 |
| 5,997,430 | 12/1999 | Tanabe | 477/46 |
| 6,013,006 | 1/2000 | Ashizawa et al. | 477/46 |
| 6,049,750 | 4/2000 | Adachi et al. | 701/51 |

*Primary Examiner*—William A. Cuchlinski, Jr.
*Assistant Examiner*—Olga Hernandez
*Attorney, Agent, or Firm*—Foley & Lardner

[57] ABSTRACT

A controller (61) calculates a transient target speed ratio based on a final speed ratio set according to a vehicle running condition and second order delay time constant gains (75, S99), and control a speed ratio of a continuously variable transmission to the transient target speed ratio via an actuator (4) (87, S103). The controller (61) also calculates the deviation between the final target speed ratio and transient target speed ratio (74, S95), and determines the second order delay time constant gains based on the deviation (74, S98). Preferably, the gains are determined so that the response rate is slower the larger the deviation (74, S134, S135, S136, S137, S139, S140, S141).

21 Claims, 15 Drawing Sheets

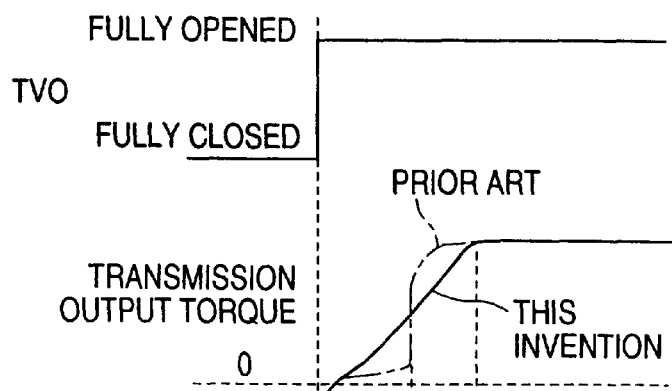
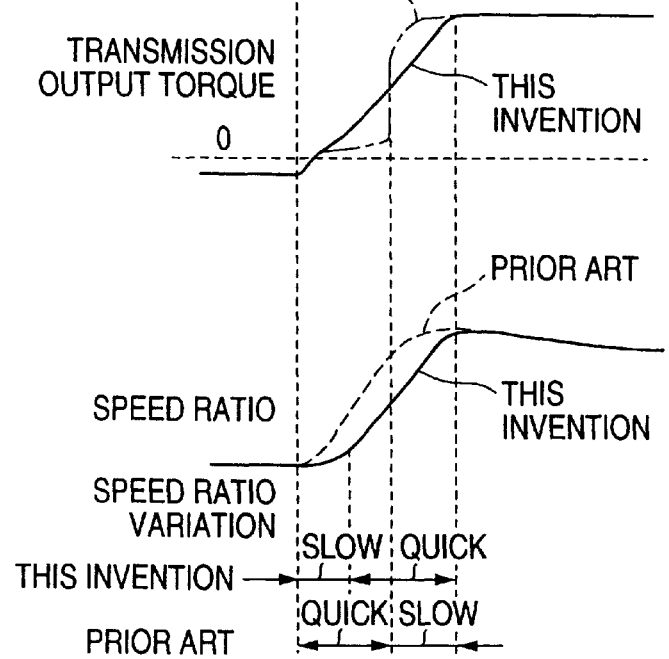
FIG.15A
FIG.15B
FIG.15C
FIG.15D

FIG.16A TVO
FIG.16B TRANSMISSION OUTPUT TORQUE
FIG.16C SPEED RATIO
FIG.16D SPEED RATIO VARIATION
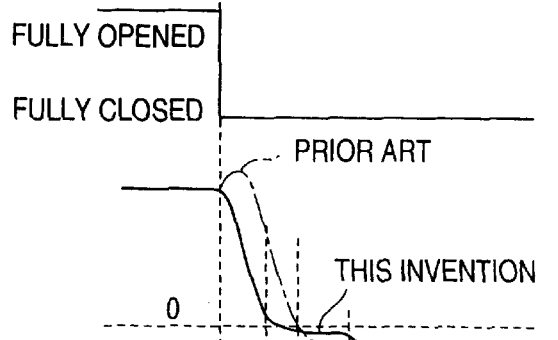
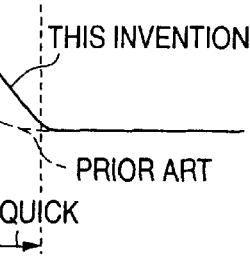

SPEED RATIO CONTROL DEVICE AND CONTROL METHOD FOR AUTOMATIC TRANSMISSION

FIELD OF THE INVENTION

This invention relates to speed ratio control of an automatic transmission for vehicles, and more particularly to a time constant which specifies a speed variation rate of the transmission.

BACKGROUND OF THE INVENTION

Regarding V-belt continuously variable transmission and toroidal continuously variable transmissions for vehicles, Tokkai Hei 5-126239 published by the Japanese Patent Office in 1993 discloses a method wherein a final target speed ratio is determined based on vehicle running conditions, such as engine load and vehicle speed, and the real speed ratio of the transmission is made to follow the final target speed ratio under a predetermined response.

More specifically, a transient target speed ratio is determined for every control cycle based on a deviation between the real speed ratio and final target speed ratio, and the speed ratio is feedback controlled to this transient target speed ratio.

SUMMARY OF THE INVENTION

In a system wherein a speed ratio is varied by an oil pressure mechanism, and a controller controls this oil pressure via a control valve and an actuator which drives the control valve, a second order delay arises between the output of the signal from the controller to the actuator, and the speed ratio variation of the controller.

However, a time constant which the prior art sets for this response delay is a first order delay time constant, and it not perfectly suited to the above-mentioned second order response delay. In other words, the transient target speed ratio set when the prior art technique is applied to the aforesaid system is not an optimum value.

Moreover, the aforesaid prior art applies a fixed value to the time constant. However, if the response from the signal output to the actuator to a speed ratio variation is always fixed, the response may become excessive and the driver or passengers may experience a speed change shock depending on the vehicle running conditions.

It is therefore an object of this invention to achieve a speed ratio control suited to a speed change control mechanism of an automatic transmission having a second order response delay.

It is a further object of this invention to optimize speed change response of the transmission according to various vehicle running conditions.

In order to achieve the above objects, this invention provides a speed ratio control device for an automatic transmission for a vehicle. The device comprises an actuator which varies a speed ratio of the transmission according to an operating command, a sensor which detects a running condition of the vehicle; and a microprocessor programmed to calculate a final target speed ratio based on the running condition of the vehicle, set second order delay time constant gains relating to a response rate from the actuator operating command to a variation of a real speed ratio of the transmission, calculate a transient target speed ratio based on the final target speed ratio and time constant gains, and output the operating command corresponding to the transient target speed ratio to the actuator.

This invention also provides a speed ratio control method of an automatic transmission for a vehicle wherein the transmission comprises an actuator which varies a speed ratio of the transmission according to an operating command. The control method comprises detecting a running condition of the vehicle, calculating a final target speed ratio based on the running condition of the vehicle, setting second order delay time constant gains relating to a response rate from the actuator operating command to a variation of a real speed ratio of the transmission, calculating a transient target speed ratio based on the final speed ratio and time constant gains, and outputting the operating command corresponding to the transient target speed ratio to the actuator.

The details as well as other features and advantages of this invention are set forth in the remainder of the specification and are shown in the accompanying drawings.

BRIEF DESCRIPTION OF THE DRAWINGS

FIGS. 15A–15D are timing charts for comparing this invention and a prior art in view of throttle opening, output torque, speed ratio and time constant during downshift due to sudden depression of an accelerator pedal.

FIGS. 16A–16D are timing charts for comparing this invention and a prior art in view of throttle opening, output torque, speed ratio and time constant during upshift due to sudden release of the accelerator pedal.

DESCRIPTION OF THE PREFERRED EMBODIMENTS

Figure 1:
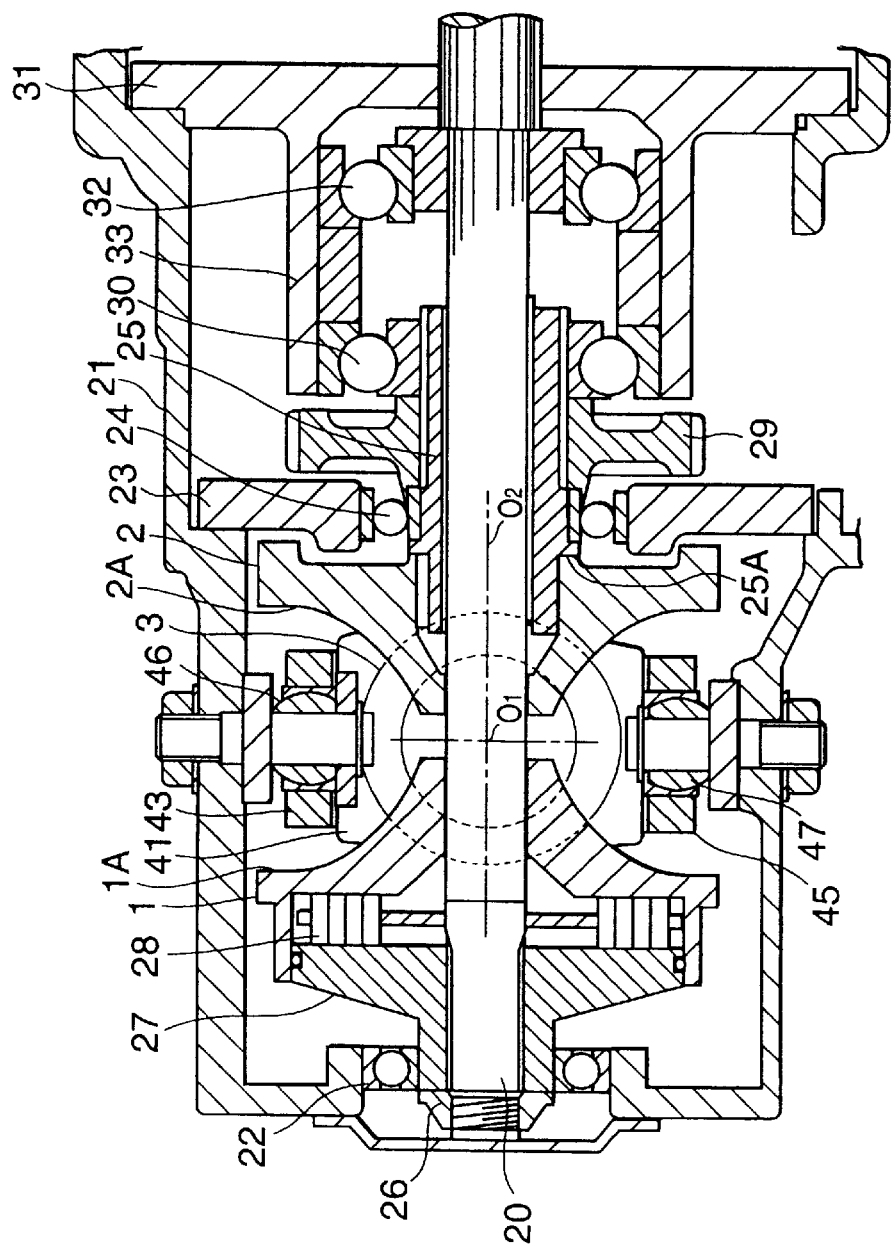
FIG. 1 is a vertical sectional view of a toroidal continuously variable transmission to which this invention is applied.

Referring to FIG. 1 of the drawings, a toroidal continuously variable transmission to which this invention is applied comprises an input shaft 20 connected to an engine which is situated on the right-hand side of the figure, not illustrated, via a torque converter, and an output gear 29 which outputs a rotation torque.

A cam flange 27 screws into the tip of the input shaft 20. A nut 26 is further tightened at the tip of the input shaft 20, and the cam flange 27 is thereby fixed to the input shaft 20.

A cylindrical rear surface of an input disk 1 is engaged with the outer circumference of the cam flange 27.

The input axis 20 passes through the core of the input disk 1 with a slight clearance. The input disk 1 is thereby held coaxial with the rotation shaft 20.

The cam flange 27 is supported in a case 21 via a bearing 22. The base end of the input shaft 20 is also supported by an angular bearing 32.

Cam rollers 28 are disposed between the cam flange 27 and the input disk 1. Each of the cam rollers 28 comprises a cam face which presses the input disk 1 to the right of the figure according to the relative rotational displacement of the cam flange 27 and the input disk 1.

An output disk 2 is attached free to rotate relative to the input disk 1 on the outer circumference of the rotation shaft 20. The input disk 1 and output disk 2 comprise toroidal curved surfaces 1A, 2A which face each other. A pair of power rollers 3 are gripped by these curved surfaces 1A, 2A.

The output disk 2 is spline jointed to a sleeve 25 supported on the outer circumference of the input shaft 20 via a needle bearing not shown A large diameter part 25A is formed in the sleeve 25 to support a thrust load which acts on the output disk 2 in a direction toward the right of the figure.

The sleeve 25 is supported by an intermediate wall 23 of the case 21 via a radial bearing 24, and is also supported by the angular bearing 30.

The angular bearings 30, 32 engage with a cylindrical cover 31 fixed to the case 21. A spacer 33 which engages with the inside of the cover 31 is also gripped by the angular bearings 30, 32.

A thrust force in the left-hand direction of the figure exerted by the input disk 1 on the input shaft 20, and a thrust force in the right-hand direction of the figure exerted by the output disk 2 on the sleeve 25, therefore cancel each other out due to the angular bearings 30, 32 and the spacer 33 gripped therebetween. A load in the radial direction acting on the angular bearings 30, 32 is also supported by the cover 31.

An output gear 29 is spline jointed to the outer circumference of the sleeve 25. The rotation of the output gear 29 is transmitted to the outside of the case 21 via a gear unit, not shown.

Figure 2:
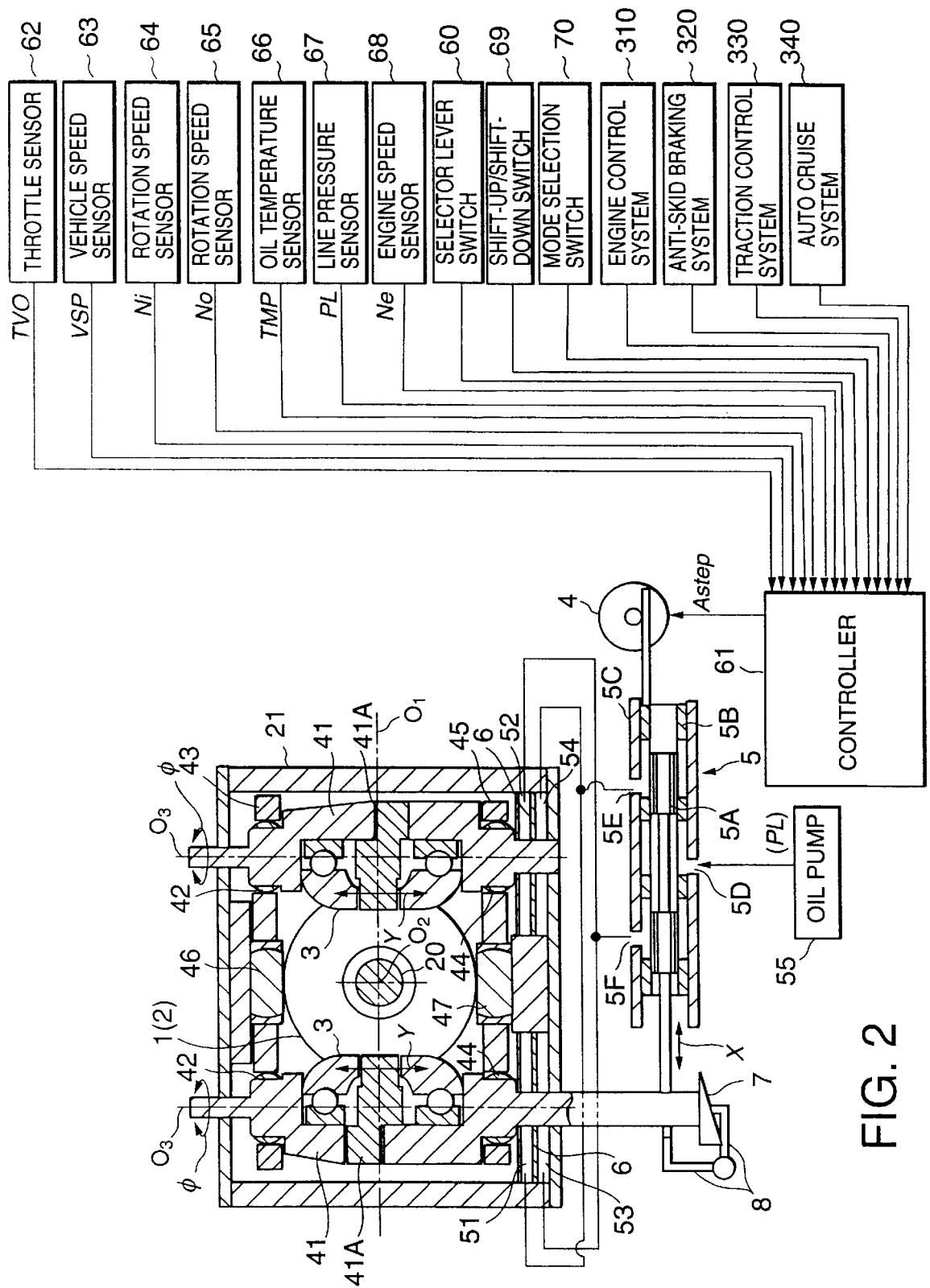
FIG. 2 is a schematic diagram of a speed ratio control device of the toroidal continuously variable transmission according to this invention.

Referring to FIG. 2, the power rollers 3 are supported by trunnions 41. By driving the trunnions 41 in a perpendicular direction to the rotation shaft 20, the contact points of the power rollers 3 with the input disk 1 and output disk 2 are displaced. As a result, due to the force which these disks 1 and 2 exert on the power rollers 3, the trunnions 41 perform rotational displacements around an axis $O_3$ and the gyration angle of the power rollers 3 is changed. Consequently, the distance of the contact point of the power rollers 3 and input disk 1 from a center axis $O_2$ of the input shaft 20 and the distance of the contact point of the power rollers 3 and output disk 2 from the center axis $O_2$ respectively vary, and the speed ratio of the transmission varies accordingly.

The trunnions 41 support the power rollers 3 so that they are free to rotate via a crank-shaped shaft 41A. They are also supported free to swing through a narrow range around the base of the shaft 41A.

The upper end of each trunnion 41 is joined to an upper link 43 via a spherical joint 42, and the lower end is joined to a lower link 45 via a spherical joint 44.

Further, the upper link 43 and lower link 45 are supported by the case 21 via spherical joints 46 and 47, respectively. Due to these links, the displacement of the pair of trunnions 41 around the axis $O_3$ are always in reverse directions, and their shift distances are also equal.

Pistons 6 are fixed to these trunnions 41. The pistons 6 displace the trunnions 41 along the axis $O_3$ according to the oil pressure balance of oil chambers 51, 53, and oil chambers 52, 54, which are formed in the case 21. Oil pressure from an oil pressure control valve 5 is supplied to these oil chambers 51, 52, 53 and 54.

The oil pressure control valve 5 comprises an outer sleeve 5C, inner sleeve 5B and a spool 5A which slides on the inside of the inner sleeve 5B. A port 5D which introduces the pressure of an oil pressure pump 55, port 5E which connects the oil chambers 51, 54 and port 5F which connects the oil chambers 52, 53, are formed in the outer sleeve 5C, respectively. The inner sleeve 5B is connected to a step motor 4 via a rack and pinion. Openings at the two ends of the inner sleeve 5B are respectively connected to a drain passage, not shown.

The spool 5A is joined to a link 8. The spool 5A is displaced according to the displacement of a precess cam 7 fixed to the lower end of one of the trunnions 4. The precess cam mechanically feeds back the displacement of the power roller 3 along and around the axis O3 to the spool 5A.

The oil pressure control valve 5 selectively supplies oil pressure to the ports 5E, 5F according to a speed change command signal Astep output from a controller 61 to the step motor 4.

For example, when spool 5A, outer sleeve 5B and inner sleeve 5C are in the positional relationship shown in FIG. 2, high pressure oil from the oil pressure pump 55 is supplied from the port 5F to the oil chambers 52, 53, and oil from the oil chambers 51, 54 is drained via the port 5E.

As a result, the left trunnion 41 in the figure moves upwards along the axis $O_3$, and the right trunnion 41 in the figure moves downwards along the axis $O_3$.

A rotation axis $O_1$ of the power rollers 3 therefore displaces from a neutral position perpendicular to the center axis $O_2$ of the input shaft 20, in the direction shown by the arrow Y in the figure.

Due to this displacement, as a result of the input disk and output disk 2 causing the power rollers 3 to suffer a rotational displacement around the axis $O_3$, the speed ratio of the transmission varies continuously.

The precess cam 7 feeds back the displacement of the trunnion 41 to the spool 5A via the link 8, and the spool 5A is made to displace in the direction shown by the arrow X in the figure.

As a result of this feedback action, when the speed ratio corresponding to the above-mentioned speed change command signal Astep is attained, the relative position of the spool 5A and the inner sleeve 5B returns to a neutral position wherein inflow and outflow into any of the oil chambers stops, and the trunnions 41 are therefore maintained in a state wherein they are displaced in the direction of the axis $O_3$.

On the other hand, the power rollers 3 which performed a rotational displacement around the axis $O_3$ pivot around the base end of the axis 41A while maintaining their new gyration angle, and return to the neutral position wherein the axis $O_1$ intersects the axis $O_2$.

The reason why the precess cam 7 feeds back not only the amount of rotational displacement of the power rollers 3 around the axis $O_3$, i.e., the gyration angle, but also the displacement amount of the trunnion 41 in the direction of the axis $O_3$, is to prevent oscillation of the speed ratio by giving a damping effect to the control.

The speed change command signal Astep is determined by the controller 61.

The controller 61 comprises a microcomputer comprising a central processing unit (CPU), read-only memory (ROM), random access memory (RAM) and input/output interface (I/O interface).

Signals are input to the controller 61 from a throttle sensor 62 which detects a throttle opening TVO of the engine, vehicle speed sensor 63 which detects a vehicle speed VSP, rotation speed sensor 64 which detects a rotation speed Ni of the input disk 1, rotation speed sensor 65 which detects a rotation speed No of the output disk 2, oil temperature sensor 66 which detects a temperature TMP of the above-mentioned oil, line pressure sensor 67 which detects a line pressure $P_L$, i.e., the oil pressure supplied to the port 5D from the oil pressure pump 55, and engine rotation speed sensor 68 which detects a rotation speed Ne of the engine.

The driver also inputs information regarding operation of the transmission to the controller 61 from a selector lever switch 60, SHIFT-UP/SHIFT-DOWN switch 69, and mode selection switch 70. The selector lever switch 60 inputs operating range signals to the controller 61 commanding an operating range of the continuously variable transmission, i.e., a forward automatic speed change travel range, forward manual speed change travel range, reverse range, neutral range and parking range, which are selected by the driver via a selector lever.

The SHIFT-UP/SHIFT-DOWN switch 69 detects a shift up or shift down command input by the driver in the forward manual speed change travel range, and inputs a corresponding signal to the controller 61.

The mode selection switch 70 is a switch whereby the driver specifies speed ratio characteristics, such as a power mode or snow mode, which are different from ordinary speed ratio characteristics. When it is desired to use speed ratio characteristics different from the usual speed ratio characteristics, an ON signal is output from the mode selection switch 70, otherwise an OFF signal is output.

Also input to the controller 16 are torque down related signals from an engine control system 310, ABS signal from an anti-skid braking system 320, TCS signal from a traction control system 330, and ASCD signal from an auto cruise system 340, respectively.

The engine control system 310 outputs the result of determining whether or not to allow a torque down request, when a torque down request signal for reducing the engine output torque is input from a torque down control device. A torque down permission signal representing the determination result is output to the controller 61 together with the torque down request signal. The torque down permission signal may implement a small torque down by a delay operation in the engine ignition timing, a large torque down by fuel cut, or it may prohibit torque down.

The anti-skid braking system 320 is a system which detects that a wheel has begun to slip due to a brake operation and reduces brake pressure. The ABS signal is ON during reduction of this brake pressure, otherwise it is OFF.

The traction control system 330 is a system which detects that a drive wheel has begun to slip during, for example, an acceleration operation, and reduces the drive force of the drive wheel. The TCS signal is ON during drive force reduction, otherwise it is OFF.

The auto cruise system 340 is a system which controls the throttle opening of the engine so that the vehicle runs at a fixed speed. The ASCD signal is ON when running control at a fixed speed is performed, otherwise it is OFF.

Based on the above signals, the controller 61 outputs the speed change command signal Astep found by various computations to the step motor 4.

Figure 3:
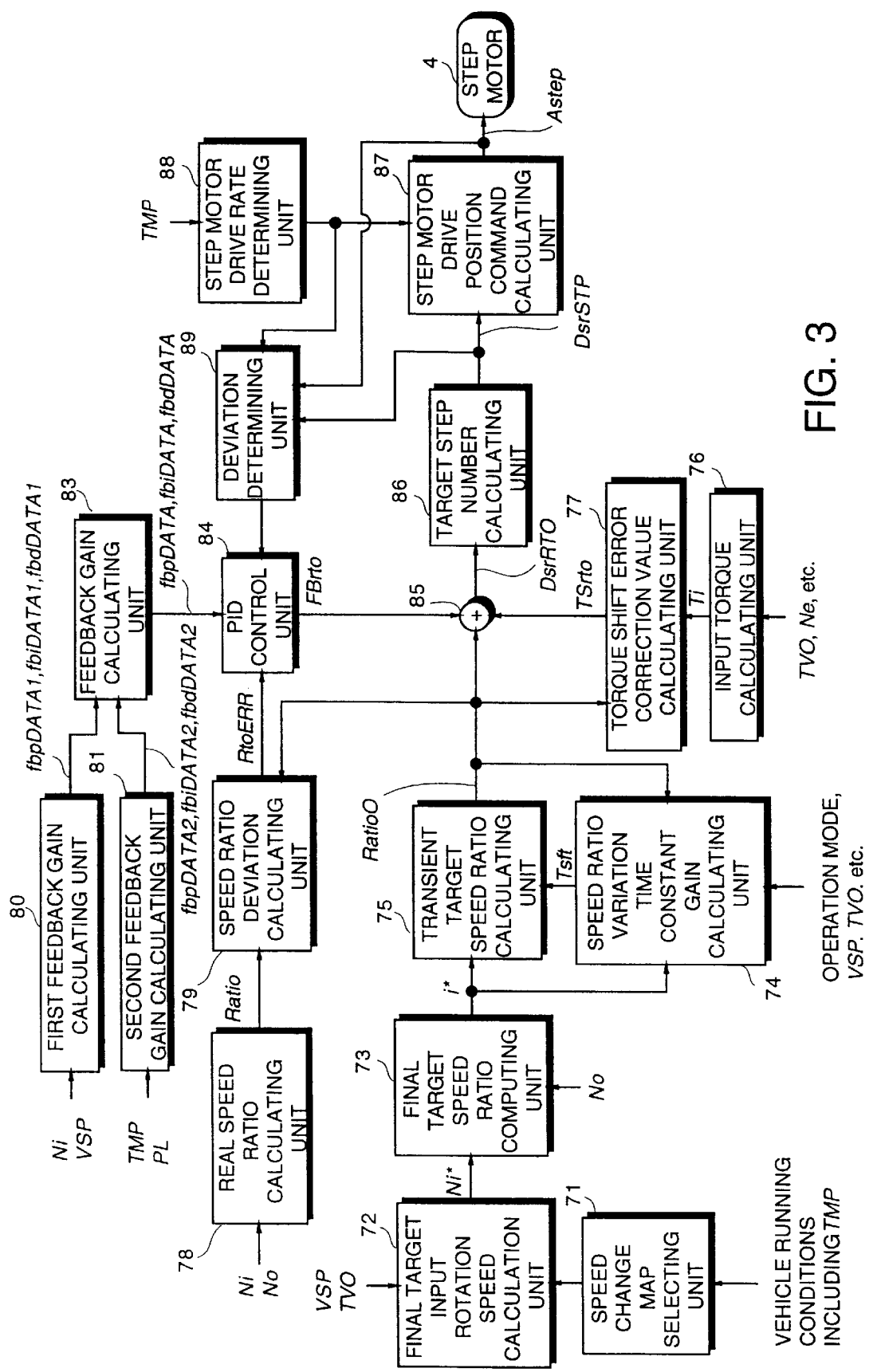
FIG. 3 is a block diagram conceptually describing the function of a controller according to this invention.

For this purpose, the controller 61 comprises the processing units shown in FIG. 3. These units are virtual units formed by the above-mentioned CPU and the functions of ROM and RAM.

Figure 4:
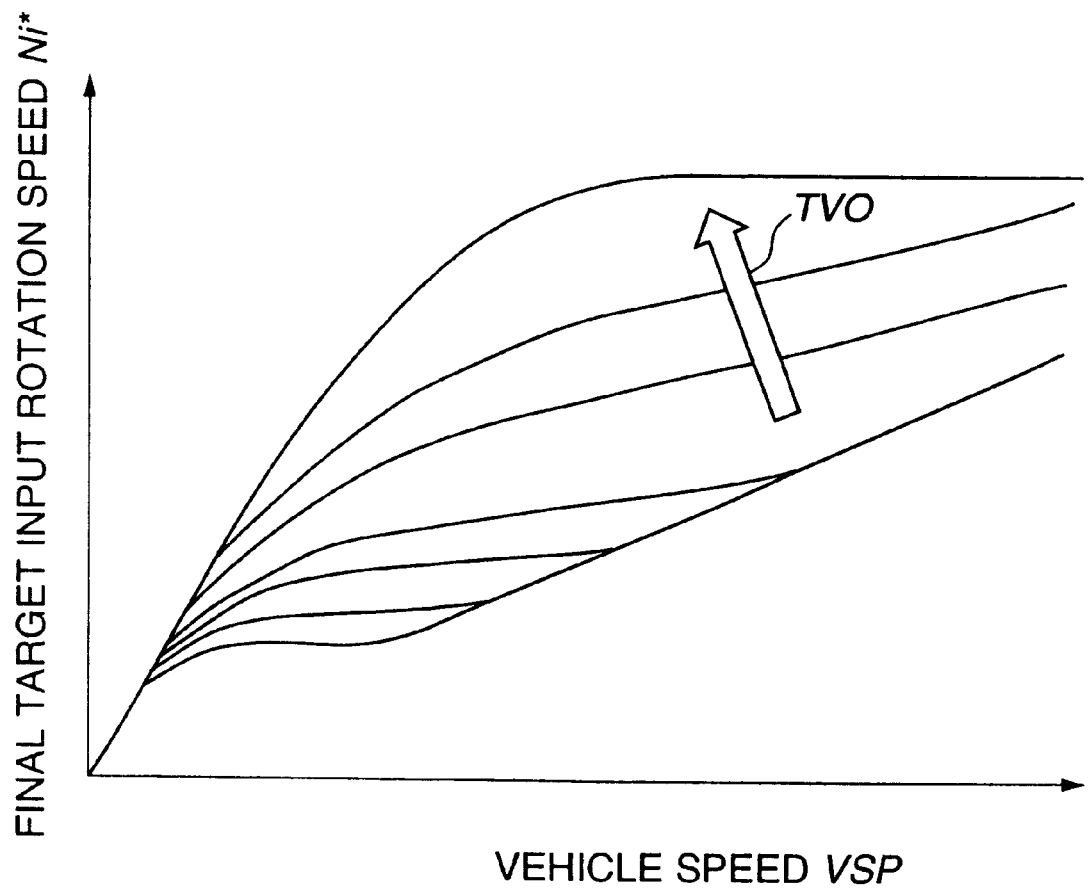
FIG. 4 is a diagram showing a speed change pattern of the toroidal continuously variable transmission.

A speed change map selecting unit 71 selects a speed change map suited to the conditions from plural speed change maps prestored in the controller 61, based on the oil temperature TMP of the continuously variable transmission detected by the oil temperature sensor 66 and other vehicle running conditions. The speed change map for automatic speed change determines the final target input rotation speed Ni* of the continuously variable transmission based on the throttle opening TVO and vehicle speed VSP, as shown in FIG. 4. Here, the final target input rotation speed Ni* is the target value of the input rotation speed of the continuously variable transmission in the steady running state.

A final target input rotation speed calculation unit 72 calculates the final target input rotation speed Ni* by looking up the selected map. A final target speed ratio computing unit 73 calculates a final speed ratio i* by dividing the final target input rotation speed Ni* by the rotation speed No of the output disk 2 detected by the rotation speed sensor 65.

A speed ratio variation time constant gain calculating unit 74 determines a first time constant gain Tg1 and second time constant gain Tg2 relating to speed ratio variation rate based on an operating range signal detected by the selector lever switch 60, vehicle speed VSP, throttle opening TVO, engine speed Ne and a deviation Eip between the final target speed ratio i* and a transient target speed ratio RatioO, described later. Here, a time constant gain is an inverse of a time constant. The larger is the time constant gain, the smaller the time constant and therefore, the faster the speed ratio variation rate of the continuously variable transmission.

The first time constant gain Tg1 and second time constant gain Tg2 are set so that the final speed ratio i* is attained at a desirable speed change rate corresponding to the second order response delay from output of the signal from the controller 16 to the step motor 4, to the speed ratio change of the toroidal continuously variable transmission.

According to this embodiment, these time constant gains are varied dynamically, and are therefore treated as variables despite the name of time constant gain.

From the final target speed ratio i*, first time constant gain Tg1 and second time constant gain Tg2, the transient target speed ratio calculating unit 75 calculates the transient target speed ratio RatioO as a target value for each control cycle and imaginary speed ratio RatioOO from the following equation. Herein, the transient target speed ratio RatioO is a transient target value for realizing the final speed ratio i* under a speed change response specified by the time constant gains Tg1, Tg2. The imaginary speed ratio is a speed ratio which is set tentatively to calculate a second order response delay shown by the following equation.

$$\text{Ratio}OO = \text{Ratio}OO_{-1} + Tg1 \cdot (i^* - \text{Ratio}OO_{-1})$$

$$\text{Ratio}O = \text{Ratio}O_{-1} + Tg2 \cdot (\text{Ratio}OO_{-1} - \text{Ratio}O_{-1})$$

where,

RatioO$_{-1}$=transient target speed ratio in immediately preceding control cycle, and RatioOO$_{-1}$=imaginary speed ratio in immediately preceding control cycle.

An input torque calculating unit 76 calculates the engine output torque from the throttle opening TVO and engine rotation speed Ne, and calculates a torque ratio t of the torque converter from the speed ratio of the input rotation speed and the output rotation speed of the torque converter.

Herein, the input rotation speed of the torque converter is equal to the engine rotation speed Ne, and the output rotation speed of the torque converter is equal to the input rotation speed Ni of the transmission. The torque ratio t is then multiplied by the engine output torque to calculate a transmission input torque Ti.

A torque shift error correction value calculating unit 77 calculates a torque shift error correction value TSrto for correcting a torque shift error which is a phenomenon peculiar to toroidal continuously variable transmissions, from the above-mentioned transient target speed ratio RatioO and above-mentioned transmission input torque Ti. This torque shift error will now be described.

During operation of the toroidal continuously variable transmission, the power rollers 3 are gripped by the input disk 1 and output disk 2. This grip pressure acts as a force which keeps the power rollers 3 away from the axis O$_1$, and it deforms the trunnions 41 which support the power rollers 3. The deformation state of this trunnion 41 varies with the fluctuation of the input torque, and introduces an error into the feedback operation of the precess cam 7. Consequently, a discrepancy occurs between the speed change command signal input to the step motor 4, and the real speed ratio. Specifically, during increase of the input torque, the real speed ratio shifts in the increase direction relative to the transient target speed ratio, and during reduction of the input torque, the real speed ratio shifts in the reduction direction relative to the transient target speed ratio. This is called the torque shift error.

The magnitude of the torque shift error varies according to the transient target speed ratio RatioO and transmission input torque Ti.

The torque shift error correction value calculating unit 77 calculates a torque shift error correction value TSrto by looking up a map prestored in the controller 61 from the transient target speed ratio RatioO and the transmission input torque Ti. The torque shift error correction value TSrto obtained is input to an adder 85 together with the transient target speed ratio RatioO.

A speed ratio feedback correction amount FBrto from the PID control unit 84 is also input to the adder 85.

Next, the speed ratio feedback correction amount FBrto win be described.

The feedback control of the speed ratio performed by the controller 61 adds a correction to the output signal to the step motor 4 to make the real speed ratio follow the transient target speed ratio RatioO, and is implemented by software. The feedback control performed by the above-mentioned precess cam 7 is a control implemented by hardware so that the speed ratio of the continuously variable transmission follows the speed ratio command signal Astep, and is different from the feedback control performed by the controller 61.

A real speed ratio calculating unit 78 first divides the input rotation speed of the transmission, i.e., the rotation speed Ni of the input disk 1, by the output rotation speed, i.e., the rotation speed No of the output disk 2, so as to compute the real speed ratio Ratio of the transmission.

A speed ratio deviation calculating unit 79 subtracts the real speed ratio Ratio from the transient target speed ratio RatioO so as to calculate a speed ratio deviation RtoERR.

Based on this speed ratio deviation RtoERR, a PID control unit 84 applies the proportional integral differential (PID) control known in the art to the transient target speed ratio RatioO for performing feedback control of the speed ratio.

A first feedback gain calculating unit 80 sets a first proportional control feedback gain fbpDATA1, first integral control feedback gain fbiDATA1 and first differential control feedback gain fbdDATA1 for this PID control based on the transmission input rotation speed Ni and vehicle speed VSP.

To set these first feedback gains, two-dimensional maps of the first feedback gains having the transmission input rotation speed Ni and vehicle speed VSP as parameters, are prestored in the controller 61, and the first feedback gain calculating unit 80 calculates these first feedback gains by looking up these maps based on the transmission input rotation speed Ni and vehicle speed VSP.

A second feedback gain calculating unit 81 sets second feedback gains which are also used in the PID control based on the transmission oil temperature TMP and line pressure P$_L$.

Herein, a second proportional control feedback gain fbpDATA2, second integral control feedback gain fbiDATA2 and second differential control feedback gain fbdDATA2 are set. These second feedback gains are also calculated by looking up maps prestored in the controller 61.

A feedback gain calculating unit 83 calculates the proportional control feedback gains fbpDATA, integral control feedback gains fbiDATA and differential control feedback gains fbdDATA by multiplying the first feedback gain and second feedback gain for the proportional control gain, integral control gain and differential control gain respectively.

The speed ratio deviation RtoERR calculated by the aforesaid speed ratio deviation calculating unit 79 and the feedback gains calculated by the feedback gain calculating unit 83 are input to the PID control unit 84.

Using the speed ratio deviation RtoERR and these feedback gains, the PID control unit 84 calculates a speed ratio feedback correction amount FBrto. For this purpose, firstly, the speed ratio feedback correction amount due to proportional control is calculated by multiplying the speed ratio deviation RtoERR by the gain fbpDATA. Next, the speed ratio feedback correction amount due to integral control is calculated by multiplying the speed ratio deviation RtoERR by the gain fbiDATA. Finally, the speed ratio feedback correction amount due to differential control is calculated by multiplying the speed ratio deviation RtoERR by the gain fbdDATA. These are then substituted into the equation for PID control known in the art to calculate the speed ratio feedback correction FBrto.

$$FBrto = RtoERR \times fbpDATA + \int RtoERR \times fbiDATA + \frac{d}{dt} RtoERR \times fbdDATA$$

The adder 85 calculates a corrected transient target speed ratio DsrRTO by adding the torque shift error correction value TSrto and speed ratio feedback correction amount FBrto to the transient target speed ratio RatioO.

A target step number calculating unit 86 calculates a target step number DsrSTP of the step motor 4 corresponding to the corrected transient target speed ratio DsrRTO by looking up a map prestored in the controller 61.

On the other hand, a step motor drive rate determining unit 88 determines the physical operation limiting speed of the step motor 4 based on the oil temperature TMP of the transmission detected by the oil temperature sensor 66.

Based on this physical operation limiting speed, a step motor drive position command calculating unit 87 determines whether or not the step motor 4 can attain the target step number DsrSTP in the aforesaid speed ratio control cycle, and a value obtained by correcting the target step number DsrSTP based on the physical operation limiting speed is set as the speed ratio command signal Astep.

Furthermore, according to this invention, a deviation determining unit 89 calculates a deviation ΔSTP between the target step number DsrSTP and speed ratio command signal Astep. The processing which the deviation determining unit 89 performs is performed after the target step number calculating unit 86 and the step motor drive position command calculating unit 87 have output the target step number DsrSTP and speed ratio command signal Astep respectively, and the result is used on the next occasion the process is performed.

First, the deviation determining unit 89 sets a maximum deviation $\Delta STP_{LIM}$ which can be eliminated during the period from the present occasion to the next occasion when the process is executed, i.e., within one control cycle, based on the aforesaid physical operation limiting speed found by the step motor drive speed determining unit 88.

If the deviation ΔSTP on the present occasion when the process is executed is equal to or less than the maximum deviation $\Delta STP_{LIM}$, it is determined that the deviation ΔSTP can be eliminated before the next occasion when the process is executed. In this case, the PID control unit 84 does not apply a limit to the calculation of the aforesaid speed ratio feedback correction amount FBrto performed in the next process.

However, if the deviation ΔSTP on the present occasion the process is executed exceeds the maximum deviation $\Delta STP_{LIM}$, it is determined that the deviation ΔSTP cannot be eliminated before the next occasion when the process is executed. In this case, in the calculation of the aforesaid speed ratio feedback correction amount FBrto that the PID control unit 84 performs on the next occasion, the PID control unit 84 commands holding of the integral control part, i.e., ∫RtoERR·fbiDATA, at its value on the present occasion the process is executed.

Here, the difference between the limit which the step motor drive position command calculating unit 87 applies to the target step number DsrSTP, and the limit which the deviation determining unit 89 applies to the calculation of the speed ratio feedback correction amount FBrto of the PID control unit 84, will be described.

The step motor drive position command calculating unit 87 limits the target step number DsrSTP to a range which the step motor 4 is physically able to achieve.

Therefore, the step motor 4 always follows the speed ratio command signal Astep, which is a target step number after limitation.

However, if a deviation arises between the target step number DsrSTP and speed ratio command signal Astep, the integral correction amount of the speed ratio feedback correction which the PID control unit 84 performs on the next occasion the process is executed, will increase. If this state continues, the feedback correction amount accumulates and the tendency of increase of the feedback correction amount will not stop until the transient target speed ratio becomes less than an upper limiting value or more than a lower limiting value.

If the state where the feedback correction amount is not effectively reflected in speed ratio control continues due to this limit imposed by the step motor drive position command calculating unit 87, and the feedback correction amount continues to increase, an overshoot of the subsequent speed ratio or a delay of convergence to the transient target speed ratio will occur.

Hence, if the deviation determining unit 89 determines that the deviation ΔSTP between the target step number DsrSTP and speed ratio command signal Astep is greater than the limiting deviation $\Delta STP_{LIM}$, in the calculation of the speed ratio feedback correction amount performed by the PID control unit 84, the integral correction amount is maintained at its value when the determination was made. Provided that increase of the integral correction amount is suppressed even if the state where the target step number DsrSTP differs from the speed ratio command signal Astep continues, overshoot of the speed ratio and delay in convergence to the transient target speed ratio can be prevented.

Next, the speed ratio control routines performed by the controller 61 using the above functions will be described referring to FIGS. 5–14. The flowchart of FIG. 5 shows the main routine of speed ratio control performed by the controller 61, and other flowcharts show subroutines.

These routines are all executed at an interval of, for example, 10 milliseconds.

Figure 5:
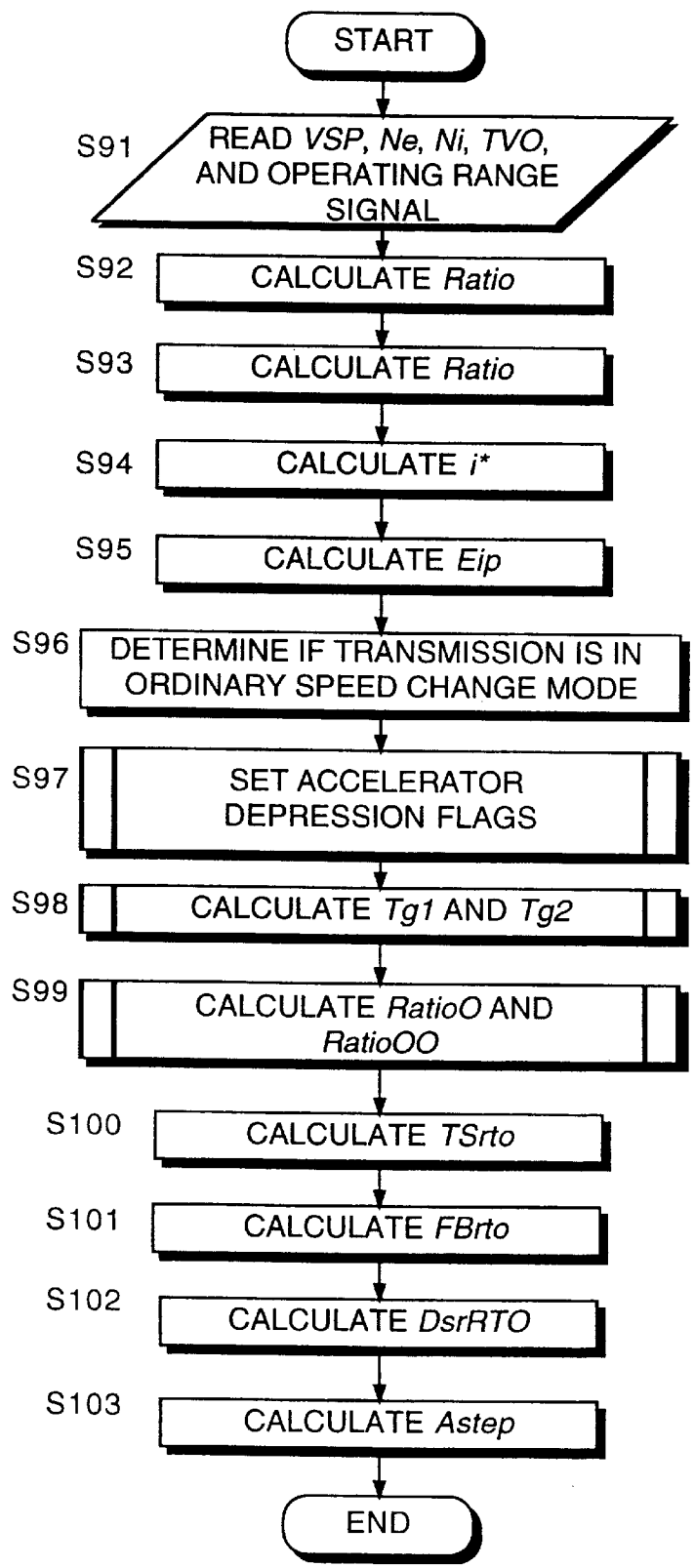
FIG. 5 is a flowchart describing a main routine of a speed ratio control performed by the controller.

First, in a step S91 of the main routine of FIG. 5, the controller 16 reads the vehicle speed VSP, engine rotation speed Ne, transmission input rotation speed Ni, throttle opening TVO, and operating range signal from the selector lever switch 60.

Next, in a step S92, the input rotation speed Ni of the transmission is divided by the output rotation speed No to compute the real speed ratio Ratio.

This processing corresponds to the function of the real speed ratio calculating unit 78 of FIG. 3.

In a step S93, a speed change map shown in FIG. 4 is looked up from the throttle opening TVO and vehicle speed VSP to calculate the final target input rotation speed Ni*. This processing corresponds to the functions of the speed change map selecting unit 71 and the final input rotation speed calculating unit 72.

In a step S94, the final target input rotation speed Ni* is divided by the transmission output rotation speed No to compute the final target speed ratio i*. This processing corresponds to the function of the final target speed ratio computing unit 73.

In a step S95, the deviation Eip between the final target speed ratio i* and the transient target speed ratio RatioO$_{-1}$ computed on the immediately preceding occasion when the routine was executed, is calculated. This processing corresponds to the function of the speed ratio variation time constant gain calculating unit 74.

In a step S96, it is determined whether or not the output signal of the mode selection switch 70 has changed, or whether or not a shift up signal or shift down signal was input from the SHIFT-UP/SHIFT-DOWN switch 69, during the period from the immediately preceding occasion when the main routine was executed to the present occasion when the main routine is executed.

When either of the determining results is affirmative, it signifies that a command was input to make the speed ratio change suddenly instead of gradually. In this case, it is determined that the mode is not the ordinary speed change mode.

On the other hand, when both of the above-mentioned determining results are negative, the continuously variable transmission performs a normal smooth speed ratio change. In this case, it is determined that the mode is the ordinary speed change mode.

This processing corresponds to the function of the speed change time constant gain calculating unit 74.

The determination result will be used later in various subroutines. In steps S97–S99, setting of accelerator depression flags, calculation of the first time constant gain Tg1 and second time constant gain Tg2, and calculation of the transient target speed ratio RatioO and imaginary speed ratio RatioOO, are respectively performed by the subroutines of FIGS. 6–8. The processing of these steps also corresponds to the function of the speed ratio variation time constant gain calculating unit 74. Each of these subroutines will be described in detail later.

In a step S100, a map is looked up to calculate the torque shift error correction value TSrto based on the transient target speed ratio RatioO and transmission input torque Ti. This processing corresponds to the function of the torque shift error correction value calculating unit 77.

In a step S101, the speed ratio feedback correction amount FBrto is computed. This processing corresponds to the function of the PID control unit 84.

In a step S102, the corrected transient target speed ratio DsrRTO is calculated by adding the torque shift error correction value TSrto and speed ratio feedback correction amount FBrto to the transient target speed ratio RatioO. This processing corresponds to the function of the adder 85.

In a step S103, the drive position command Astep to the step motor 4 is computed, and the routine is terminated. This processing corresponds to the function of the step motor drive position command calculating unit 87.

Figure 6:
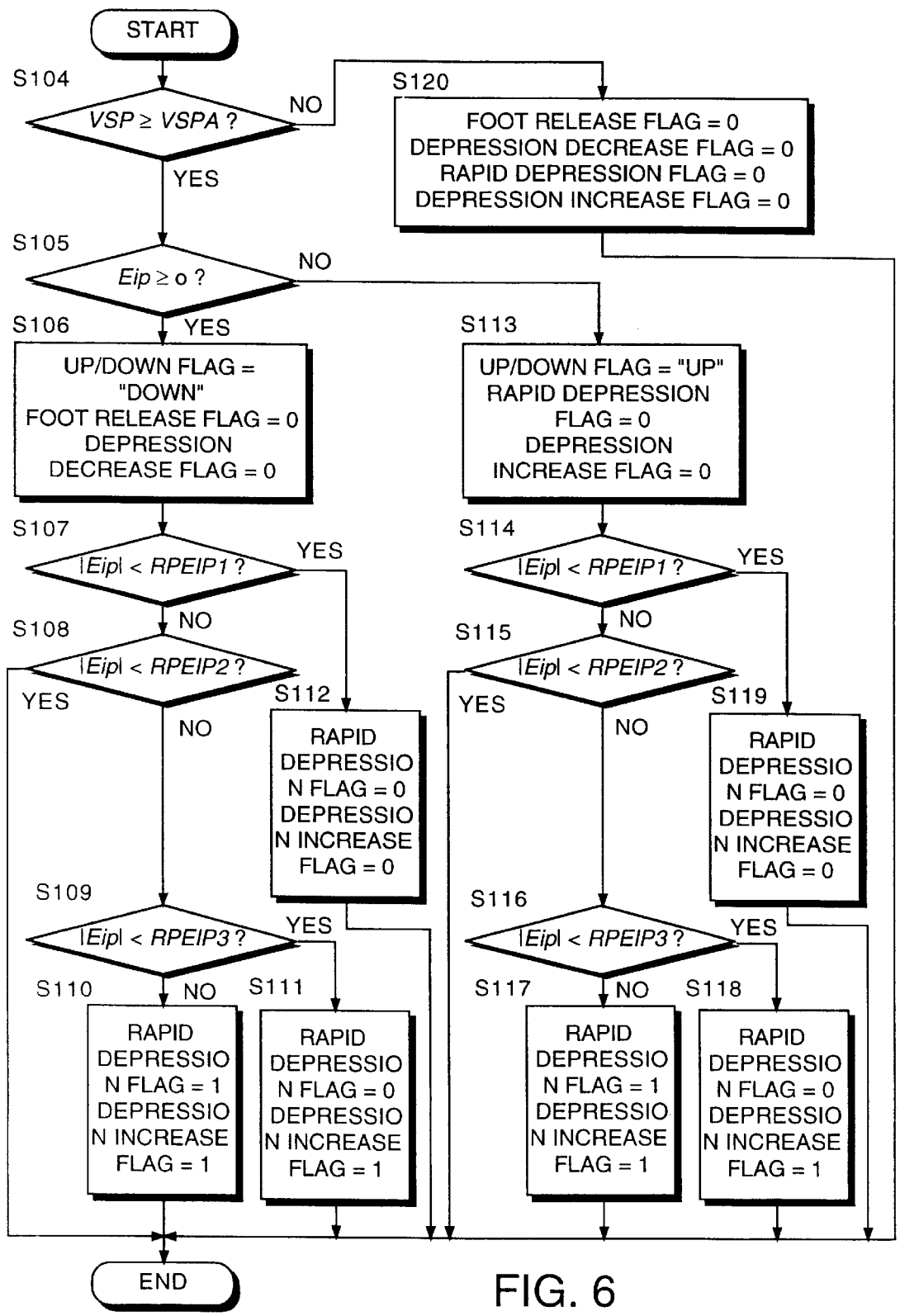
FIG. 6 is a flowchart describing a subroutine for setting accelerator depression flags performed by the controller.

Next, the subroutine which sets the accelerator depression flags will be described referring to FIG. 6.

The accelerator depression flags are plural flags set to show the state of depression of an accelerator pedal by the driver, and comprise a foot release flag, depression decrease flag, rapid depression flag and depression increase flag.

First, in a step S104, it is determined whether or not the vehicle is stationary or running slowly. This is done by determining whether or not the vehicle speed VSP is equal to or greater than a predetermined value VSPA.

When the vehicle speed VSP is equal to or greater than the predetermined value VPSA, the subroutine proceeds to a step S105. Herein, it is determined whether or not the deviation Eip between the final target speed ratio i* and transient target speed ratio RatioO is 0 or greater.

When the deviation Eip is 0 or greater, it is determined that the transmission is operating in the downshift direction due to depression of the accelerator pedal by the driver, and an UP/DOWN flag is set to "DOWN" in a step S106. The foot release flag and depression decrease flag are also both reset to 0.

Next, it is determined in a step S107 whether or not the absolute value of the deviation Eip is less than a predetermined value RPEIP1.

When the absolute value of the deviation Eip is equal to or greater than the predetermined value RPEIP1, it is determined in a step S108 whether or not the absolute value of the deviation Eip is less than a predetermined value RPEIP2. Herein, RPEIP2>RPEIP1. When the absolute value of Eip is equal to or greater than the predetermined value RPEIP2, it is determined in a step S109 whether or not the absolute value of the deviation Eip is less than a predetermined value RPEIP3. Herein, RPEIP3>RPEIP2.

When the absolute value of the deviation Eip is equal to or greater than the predetermined value RPEIP3, it is determined that the accelerator pedal is being depressed abruptly, the rapid depression flag and depression increase flag are both set to 1 in a step S110, and the subroutine is terminated.

When the absolute value of the deviation Eip is less than the predetermined value RPEIP3, it is determined that the accelerator pedal is being depressed but not abruptly, the depression increase flag is set to 1 in a step S111, the rapid depression flag is reset to 0, and the subroutine is terminated.

When the absolute value of the deviation Eip is less than the predetermined value RPEIP1 in the step S107, it is determined that the accelerator pedal is not being depressed, the rapid depression flag and depression increase flag are both reset to 0 in a step S112, and the subroutine is terminated.

When the absolute value of the deviation Eip is less than the predetermined value RPEIP2 in the step S108, the values of the depression increase flag and rapid depression flag are maintained at the values they had on the immediately preceding occasion the subroutine was performed, and the subroutine is terminated.

On the other hand, when the deviation Eip is less than 0 in the step S105, it is determined that the transmission is operating in the upshift direction due to the driver returning the accelerator pedal. In this case, the UP/DOWN flag is set to "UP" in a step S113. The depression increase flag and rapid depression flag are also both reset to 0.

Next, in a step S114, it is determined whether or not the absolute value of the deviation Eip is less than the predetermined value RSEIP1. When the absolute value of the deviation Eip is equal to or greater than the predetermined value RSEIP1, it is determined in a step S115 whether or not the absolute value of the deviation Eip is less than the predetermined value RSEIP2. Herein, RSEIP2>RSEIP1.

When the absolute value of the deviation Eip is equal to or greater than the predetermined value RSEIP2, it is determined in a step S116 whether or not the absolute value of the deviation Eip is less than the predetermined value RSEIP3. Herein, RSEIP3>RSEIP2.

When the absolute value of the deviation Eip is equal to or greater than the predetermined value RSEIP3, it is determined that the accelerator pedal is being released, the foot release flag and depression decrease flag are both set to 1 in a step S117, and the subroutine is terminated.

When the absolute value of the deviation Eip is less than the predetermined value RSEIP3, it is determined that the accelerator pedal is being returned but not released, the depression decrease flag is set to 1, the foot release flag is reset to 0 in a step S118, and the subroutine is terminated.

When the absolute value of the deviation Eip is less than the predetermined value RSEIP1 in the step S114, it is determined that the accelerator pedal is not being released or returned, the depression decrease flag and foot release flag are both reset to 0 in a step S119, and the subroutine is terminated.

When the absolute value of the deviation Eip is less than the predetermined value RSEIP2 in the step S115, the depression decrease flag and foot release flag are maintained at the values they had on the immediately preceding occasion when the routine was executed, and the subroutine is terminated.

On the other hand, when the vehicle speed VSP in the determination of the first step S104 is less than the predetermined value VSPA, the foot release flag, depression decrease flag, depression increase flag and rapid depression flag are all reset to 0, and the subroutine is terminated.

The predetermined values RPEIP1, RPEIP2, RPEIP3, RSEIP1, RSEIP2 and RSEIP3 are determined experimentally according to the vehicle conditions.

Figure 7:
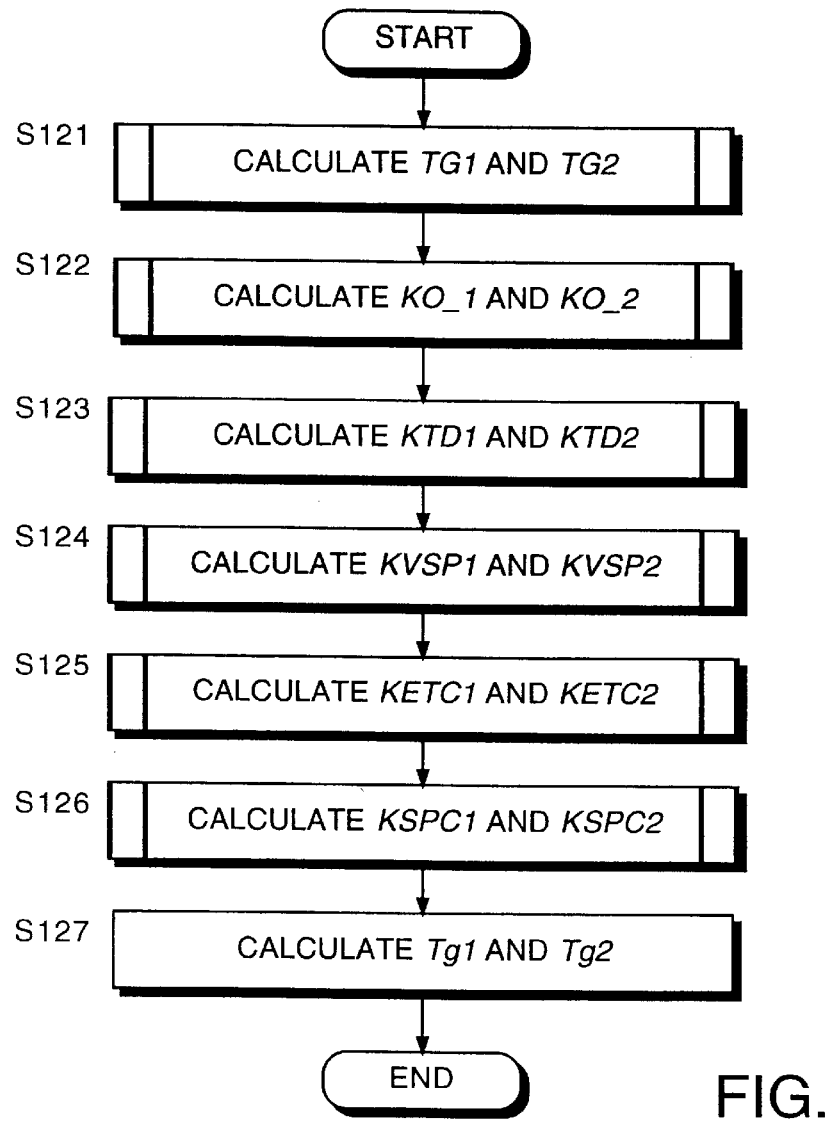
FIG. 7 is a flowchart describing a subroutine for computing a time constant performed by the controller.

Next, the subroutine for calculating the first time constant gain Tg1 and the second time constant gain Tg2 will be described referring to FIG. 7.

Figure 9:
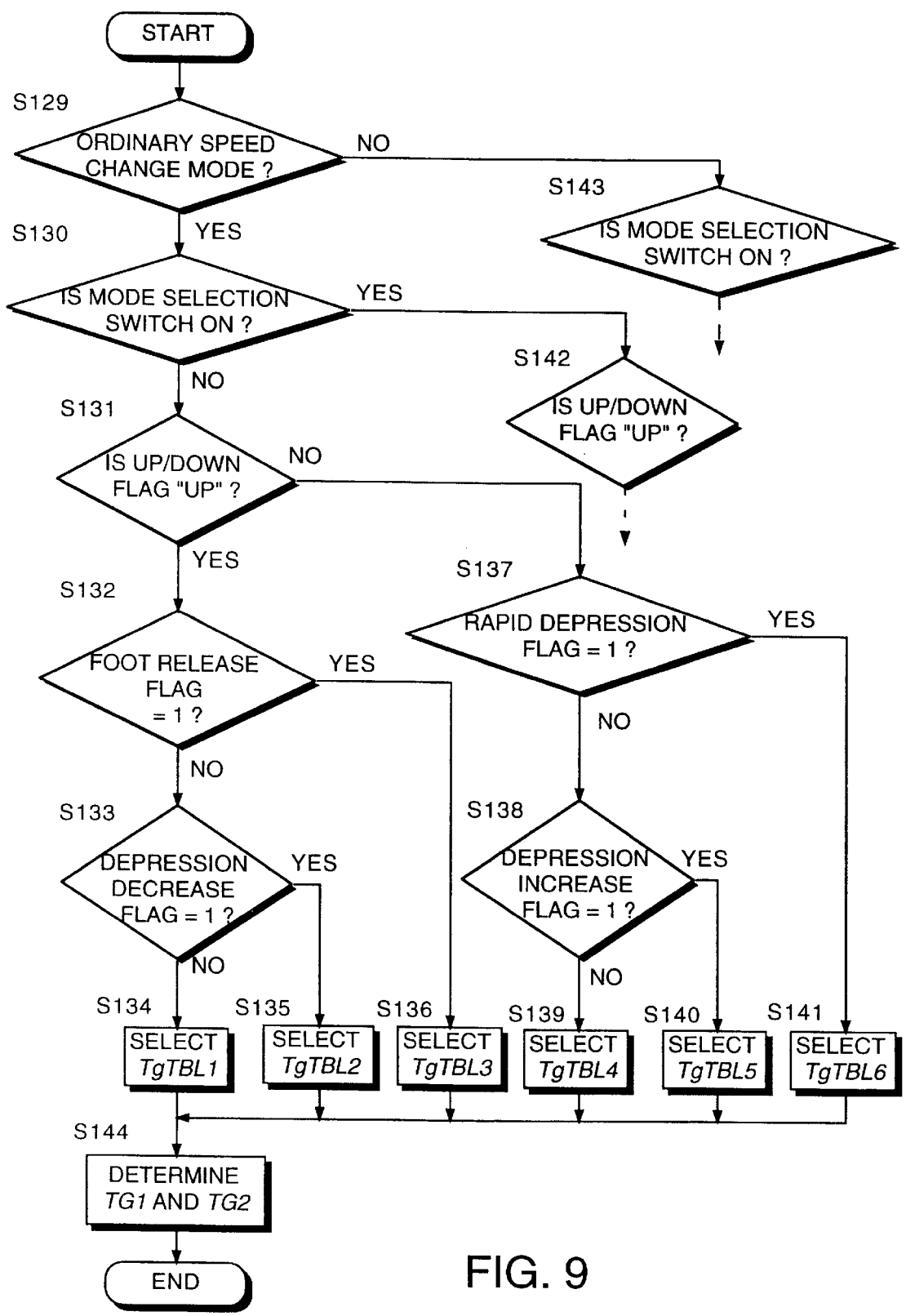
FIG. 9 is a flowchart describing a subroutine for calculating first and second basic time constants performed by the controller.

First, in a step S121, the first basic time constant gain TG1 and the second basic time constant gain TG2 are set by a subroutine shown in FIG. 9. This is found from a map according to the accelerator depression flags set by the subroutine of FIG. 6. This calculation method will be described later.

Figure 10:
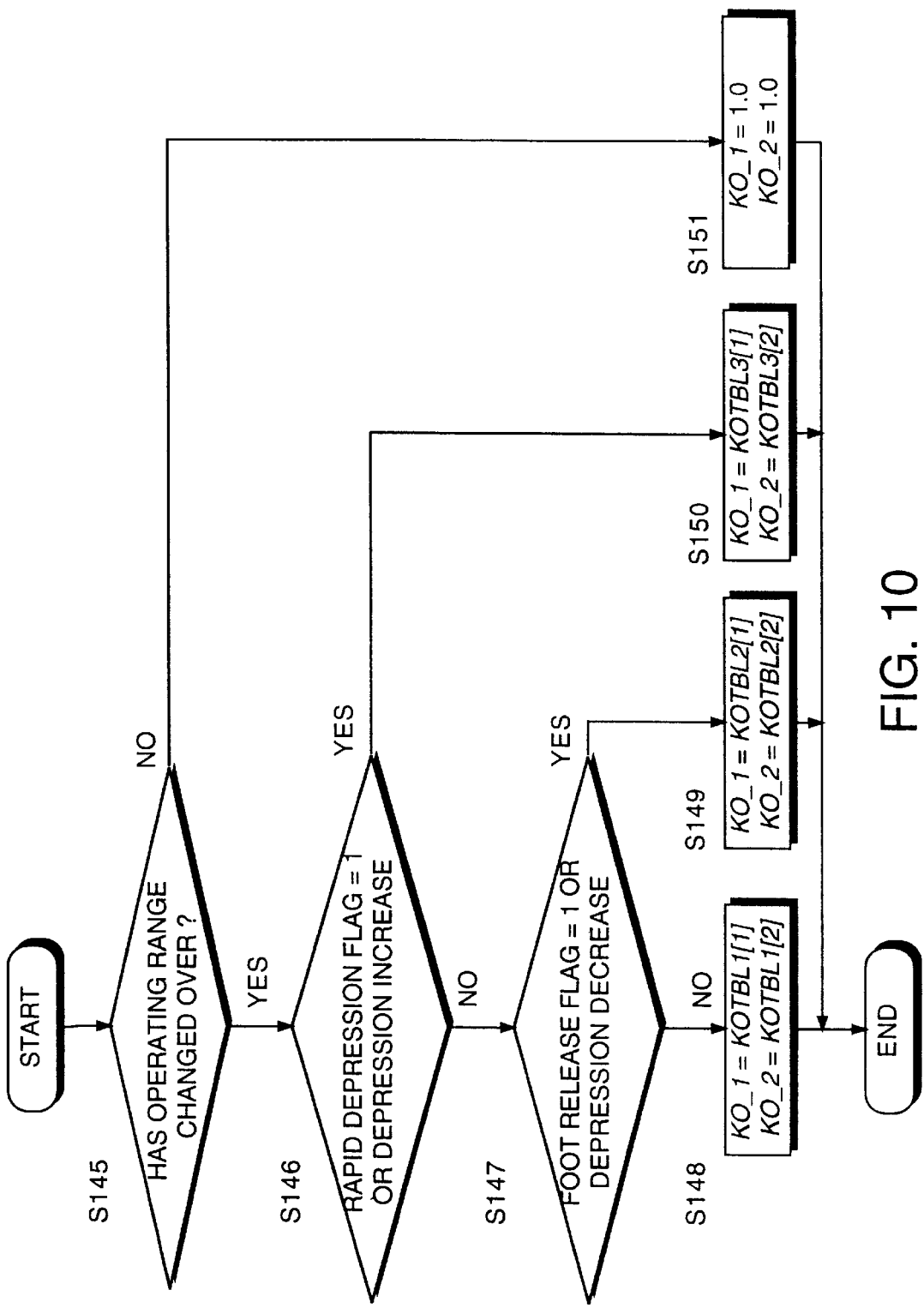
FIG. 10 is a flowchart describing a subroutine for calculating first and second shift correction coefficients performed by the controller.

In a subsequent step S122, a first shift correction coefficient KO_1 and second shift correction coefficient KO_2 set according to a variation of operating range of the transmission are calculated by a subroutine shown in FIG. 10. This calculation method is also described later.

Figure 11:
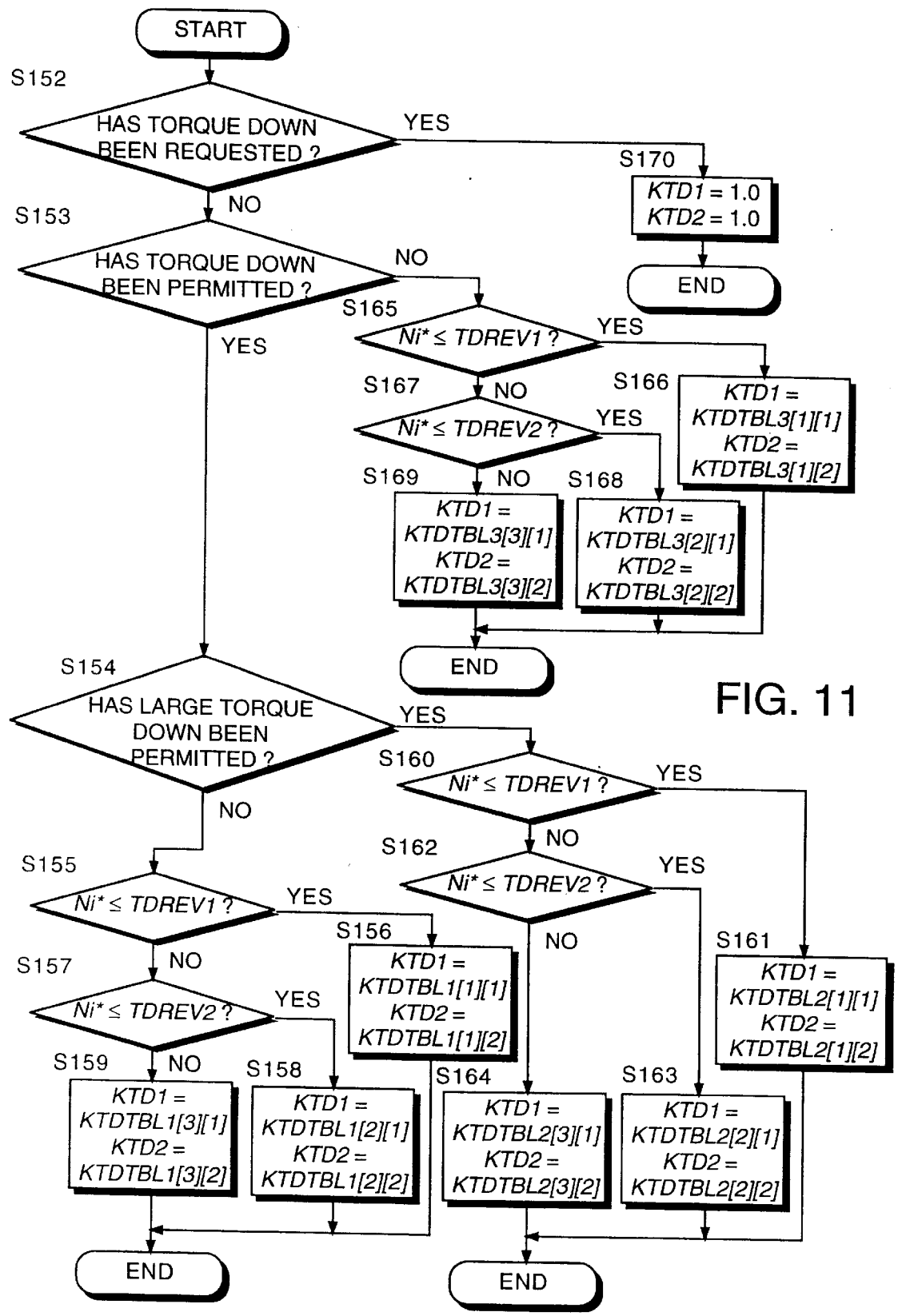
FIG. 11 is a flowchart describing a subroutine for calculating first and second torque down correction coefficients performed by the controller.

In a subsequent step S123, a first torque down correction coefficient KTD1 and second torque down correction coefficient KTD2 set in relation to the engine output torque are calculated by a subroutine shown in FIG. 11. This calculation method is also described later.

Figure 12:
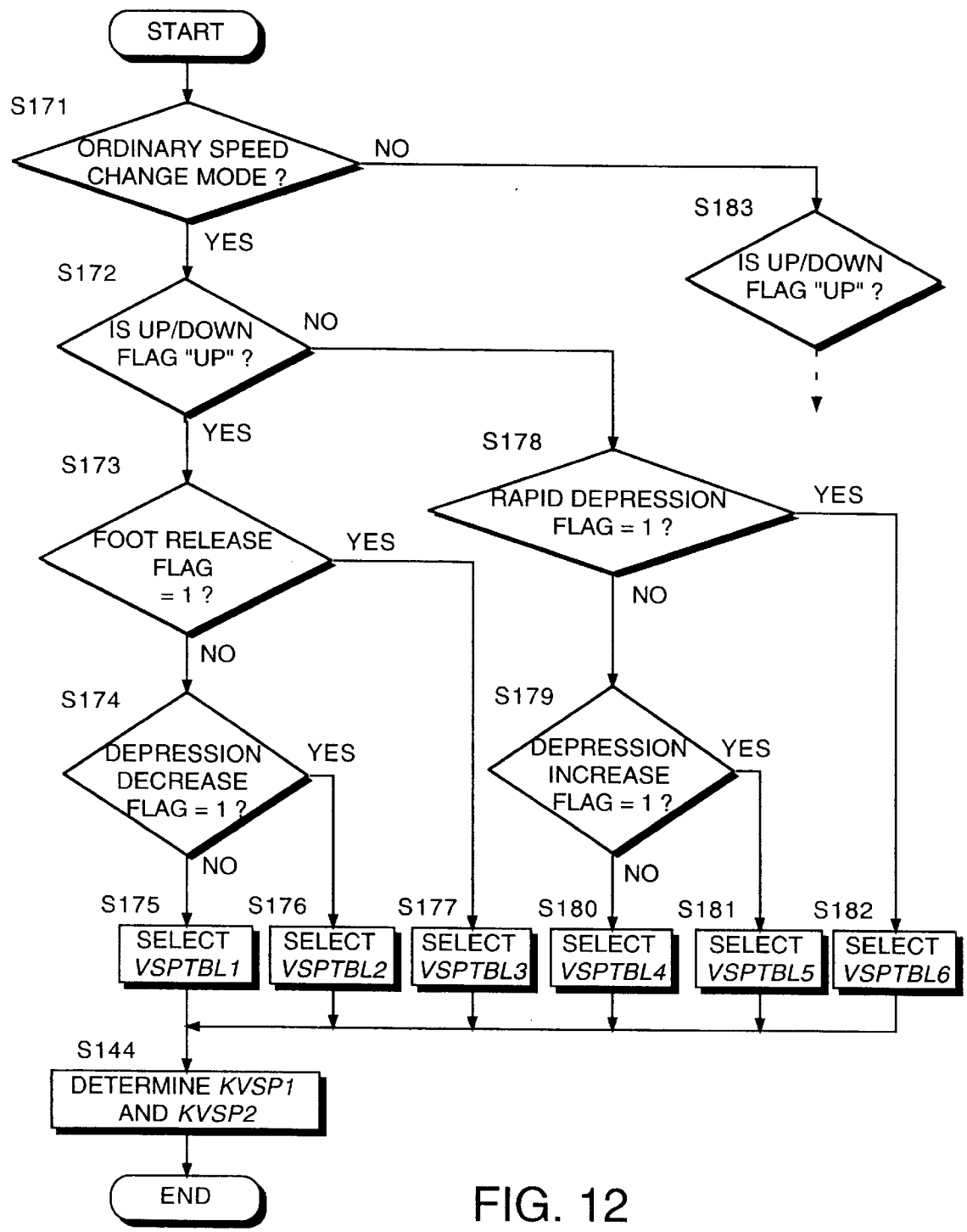
FIG. 12 is a flowchart describing a subroutine for calculating first and second vehicle speed correction coefficients performed by the controller.

In a subsequent step S124, a first vehicle speed correction coefficient KVSP1 and second vehicle speed correction coefficient KVSP2 set in relation to the vehicle speed VSP are calculated by a subroutine shown in FIG. 12. This calculation method is also described later.

Figure 13:
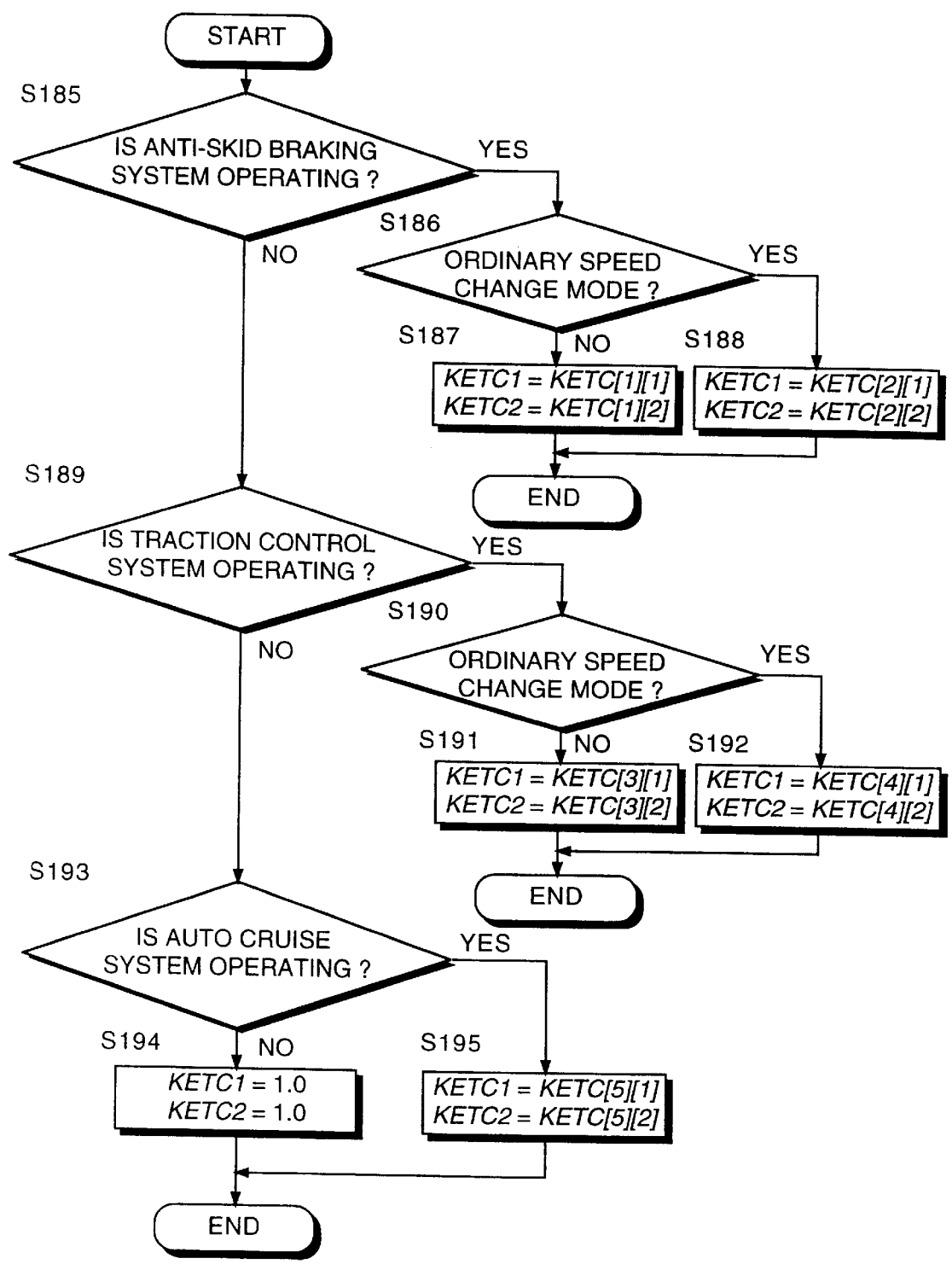
FIG. 13 is a flowchart describing a subroutine for calculating first and second running state correction coefficients performed by the controller.

In a subsequent step S125, a first running state correction coefficient KETC1 and second running state correction coefficient KETC2 set in relation to the running state of the vehicle, which is related to the anti-skid braking system 320, traction control system 330 and auto cruise system 340, are calculated by a subroutine shown in FIG. 13. This calculation method is also described later.

Figure 14:
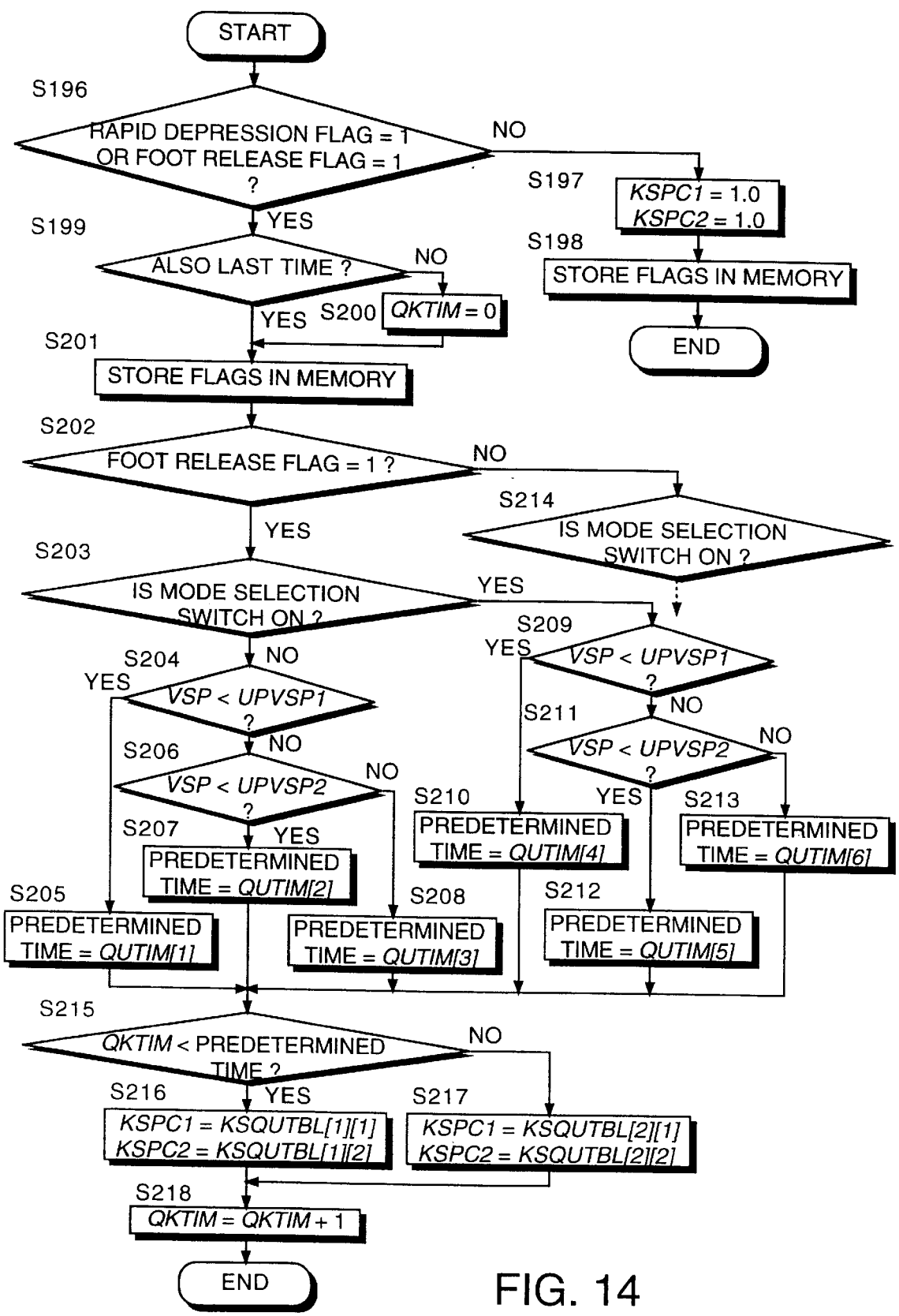
FIG. 14 is a flowchart describing a subroutine for calculating first and second accelerator pedal depression correction coefficients performed by the controller.

In a subsequent step S126, a first accelerator pedal depression correction coefficient KSPC1 and second accelerator pedal depression correction coefficient KSPC2 set in relation to the depression state of the accelerator pedal, are calculated by a subroutine shown in FIG. 14. This calculation method is also described later.

In a final step S127, the first time constant gain Tg1 is calculated by multiplying the first basic time constant gain TG1, first shift correction coefficient KO_1, first torque down correction coefficient KTD1, first vehicle speed correction coefficient KVSP1, first running state correction coefficient KETC1, first accelerator pedal depression correction coefficient KSPC1 calculated as described above. Likewise, the second time constant gain Tg2 is calculated by multiplying the second basic time constant gain TG2, second shift correction coefficient KO_2, second torque down correction coefficient KTD2, second vehicle speed correction coefficient KVSP2, second running state correction coefficient KETC2 and second accelerator pedal depression coefficient KSPC2.

Next, the subroutine which calculates the transient target speed ratio RatioO and imaginary speed ratio RatioOO will be described referring to FIG. 8.

In a step S128, a difference between the final target speed ratio i* and the imaginary speed ratio $RatioOO_{-1}$ found in the immediately preceding control cycle is multiplied by the first speed change time constant gain Tg1, and the present imaginary speed ratio RatioOO is calculated by adding the result to $RatioOO_{-1}$.

Further, a difference between the imaginary speed ratio $RatioOO_{-1}$ and the transient target speed ratio $RatioO_{-1}$ found in the immediately preceding control cycle is multiplied by the second speed change time constant gain Tg2, and the present transient target speed ratio RatioO is calculated by adding the result to $RatioO_{-1}$.

Figure 8:
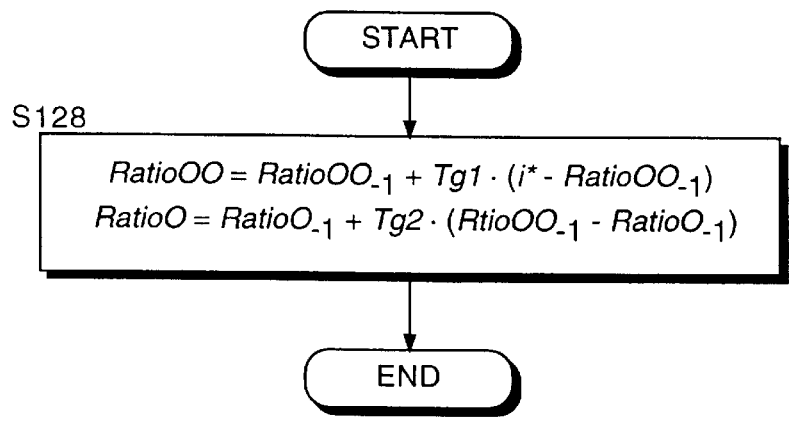
FIG. 8 is a flowchart describing a subroutine for calculating an imaginary speed ratio and transient target speed ratio performed by the controller.

The calculation formula shown in the step S128 of FIG. 8 are identical to the calculation formula shown in the description of the transient target speed ratio calculating unit 75.

Next, a subroutine which calculates the first basic time constant TG1 and second time constant TG2 will be described referring to FIG. 9.

First, in a step S129, it is determined whether or not the operating mode is the ordinary speed change mode. This based on the determining result of the step S96 of the main routine.

In the case of the ordinary speed change mode, it is determined in a step S130 whether or not the input signal from the mode selection switch 70 is ON. When the output signal of the mode selection switch 70 is OFF, i.e., when the use of special speed ratio characteristics different from those of the ordinary speed ratio characteristics is not required, it is determined in a step S131 whether or not the UP/DOWN flag is "UP" or "DOWN."

When the UP/DOWN flag is "UP", it is determined in a step S132 whether or not the foot release flag is 1.

When the foot release flag is not 1, it is determined in a step S133 whether or not the depression decrease flag is 1.

When the foot return flag is not 1, a table TgTBL1 is selected in a step S134. When the foot return flag is 1, a table TgTBL2 is selected in a step S135.

When the foot release flag is 1 in the step S132, a table TgTBL3 Is selected in a step S136.

On the other hand, when the UP/DOWN flag is "DOWN" in the step S131, it is determined in a step S137 whether or not the rapid depression flag is 1.

When the rapid depression flag is not 1, it is determined in a step S138 whether or not the depression increase flag is 1. When the depression increase flag is not 1, table TgTBL4 is selected in a step S139. When the depression increase flag is 1, a table TgTBL5 is selected in a step S140.

When the rapid depression flag is 1 in the step S137, a table TgTBL6 is selected in a step S141.

When the input signal from the mode selection switch 70 is ON in the step S130, in a step S142 and subsequent steps, tables TgTBL7–TgTBL12 are selected by the same process as that of the steps S131–S141.

Further, when it is determined that the mode is not the ordinary speed change mode in the step S129, in a S143 and subsequent steps, tables TgTBL13–TgTBL24 are selected by the same process as that of the steps S131–S141.

After selecting one of the above tables, the first basic time constant gain TG1 and second basic time constant gain TG2 are determined in a step S144 based on the throttle opening TVO by looking up the selected table, and this subroutine is terminated.

The above-mentioned tables are set to give larger values to the basic time constant gains TG1, TG2 the larger the throttle opening TVO. In the idle running state of the engine, as the throttle opening TVO is zero, the smallest values are given to the basic time constant gains TG1, TG2. In other words, when the engine is in the idle running state, the response of the speed ratio variation is slowest.

The tables are also set to give smaller values to the basic time constant gains TG1,TG2 the more rapid the depression of the accelerator pedal for the same throttle opening TVO. In other words, the first basic time constant gain TG1 and second basic time constant gain TG2 are set to their smallest values when the rapid depression flag or foot release flag is 1, they are set to their next smallest values when these flags are 0 and the depression increase flag or depression decrease flag is 1, and they are set to larger values than in the other two cases when all the flags are 0. Therefore, of TgTBL1–TgTBL3, TgTBL3 gives the smallest value, TgTBL2 gives the next smallest value and TgTBL1 gives the largest value to the first basic time constant gain TG1 and second basic time constant gain TG2. Regarding TgTBL4–TgTBL6, TgTBL6 gives the smallest value, TgTBL5 gives the next smallest value and TgTBL4 gives the largest value. Due to this setting, the variation rate of the speed ratio is slower the faster the depression rate of the accelerator pedal.

Next, a subroutine which calculates the first shift correction coefficient KO_1 and second shift correction coefficient KO_2 will be described referring to FIG. 10.

First, in a step S145, it is determined whether or not there was a change-over of operating range during the period from the immediately preceding occasion when the subroutine was executed to the present occasion when the subroutine was executed, based on the operating range signal input from the selector lever switch 60. This determination is performed by comparing the operating range signal on the immediately preceding occasion when the subroutine was executed to the present operating range signal.

When a change-over of operating range is performed, it is determined in a step S146 whether or not the rapid depression flag or depression increase flag is 1.

When neither of the flags is 1, it is determined in a step S147 whether or not the foot release flag or depression decrease flag is 1.

When neither of the flags is 1, in a step S148, the first shift correction coefficient KO_1 is set to KOTBL1[1], the second shift correction coefficient KO_2 is set to KOTBL1[2], and the subroutine is terminated.

When either the foot release flag or depression decrease flag is 1, in a step S149, the first shift correction coefficient KO_1 is set to KOTBL2[1], the second shift correction coefficient KO_2 is set to KOTBL2[2], and this routine is terminated.

When the rapid depression flag or depression increase flag is 1 in the step S146, in a step S150, the first shift correction coefficient KO_1 is set to KOTBL3[1], the second shift correction coefficient KO_2 is set to KOTBL3[2], and the subroutine is terminated.

When it is determined that a change-over of operating range was not performed in the step S145, the first shift correction coefficient KO_1 and second shift correction coefficient KO_2 are both set to 1.0 in a step S151, and the subroutine is terminated without performing any correction regarding the operation range shift.

Here, the following relations hold regarding the first shift correction coefficient KO_1.

1.0>KOTBL1[1]>KOTBL2[1]

1.0>KOTBL1[1]>KOTBL3[1]

The following relations hold regarding the second shift correction coefficient KO_2.

1.0>KOTBL1[2]>KOTBL2[2]

1.0>KOTBL1[2]>KOTBL3[2].

Therefore, when a change-over of operating range is performed, a correction is applied which reduces the time constant gain, i.e., which reduces the speed ratio variation rate. As a result, a sharp fluctuation of speed ratio due to change-over of the operating range is suppressed.

Next, a subroutine which calculates the first torque down correction coefficient KTD1 and second torque down correction coefficient KTD2 will be described referring to FIG. 11.

First, in a step S152, it is determined whether or not torque down of the engine has been requested by the torque down control device. This determination is performed based on a torque down request signal which the engine control system 310 outputs to the controller 16.

When a torque down has been requested, it is determined in a step S153 whether or not the torque down has been permitted. This determination is performed based on the torque down permission signal which the engine control system 310 outputs to the controller 16.

When the torque down is permitted, it is determined in a step S154 whether or not the torque down permission signal permits a large torque down, i.e., whether or not a torque down due to fuel cut is permitted. When a large torque down is not permitted, it is determined in a step S155 whether or not the final target input rotation speed Ni* is equal to or less than the predetermined value TDREV1. When the final target input rotation speed Ni* is equal to or less than the predetermined value TDREV1, in a step S156, the first torque down correction coefficient KTD1 is set to KTDTBL1[1][1], the second torque down correction coefficient KTD2 is set to KTDTBL1[1][2], and the subroutine is terminated.

When the final target input rotation speed Ni* is larger than the predetermined value TDREV1 in the step S155, it is determined in a step S157 whether or not the final target input rotation speed Ni* is equal to or less than a predetermined value TDREV2. It is assumed that TDREV1<TDREV2.

When the final target input rotation speed Ni* is equal to or less than the predetermined value TDREV2, in a step S158, the first torque down correction coefficient KTD1 is set to KTDTBL1[2][1], the second torque down correction coefficient KTD2 is set to KTDTBL1[2][2], and the subroutine is terminated.

When the final target input rotation speed Ni* is larger than the predetermined value TDREV2, in a step S159, the first torque down correction coefficient KTD1 is set to KTDTBL1[3][1], the second torque down correction coefficient KTD2 is set to KTDTBL1[3][2], and the subroutine is terminated.

When the torque down permission signal permits a large torque down in the step S154, i.e., when engine fuel cut is permitted, the subroutine proceeds to a step S160.

It should be noted that when torque down is permitted, either a small torque down or a large torque down is permitted.

In the step S160, it is determined whether or not the final target input rotation speed Ni* is less than the predetermined value TDREV1. When the final input rotation speed Ni* is equal to or less than the predetermined value TDREV1, the first torque down correction coefficient KTD1 is set to KTDTBL2[1][1] and the second torque down correction coefficient KTD2 is set to KTDTBL2[1][2] in a step S161, and the subroutine is terminated.

When the final target input rotation speed Ni* is larger than the predetermined value TDREV1 in the step S160, it is determined in a step S162 whether or not the final target input rotation speed Ni* is equal to or less than a predetermined value TDREV2. When the final target input rotation speed Ni* is equal to or less than the predetermined value TDREV2, the first torque down correction coefficient KTD1 is set to KTDTBL2[2][1], the second torque down correction coefficient KTD2 is set to KTDTBL2[2][2] in a step S163, and the subroutine is terminated.

When the final target input rotation speed Ni* is larger than the predetermined value TDREV2, the first torque down correction coefficient KTD1 is set to KTDTBL2[3][1] and the second torque down correction coefficient KTD2 is set to KTDTBL2[3][2] in a step S164, and the subroutine is terminated.

On the other hand, when torque down is not permitted in the step S153, it is determined in a step S165 whether or not the final target input rotation speed Ni* is equal to or less than the predetermined value TDREV1. When the final target input rotation speed Ni* is equal to or less than the predetermined value TDREV1, the first torque down correction coefficient KTD1 is set to KTDTBL3[1][1] and the second torque down correction coefficient KTD2 is set to KTDTBL3[1][2] in a step S166, and the subroutine is terminated.

When the final target input rotation speed Ni* is larger than the predetermined value TDREV1 in the step S165, it is determined in a step S167 whether or not the final target input rotation speed Ni* is equal to or less than the predetermined value TDREV2. When the final input rotation speed Ni* is equal to or less than the predetermined value TDREV2, the first torque down correction coefficient KTD1 is set to KTDTBL3[2][1] and the second torque down correction coefficient KTD2 is set to KTDTBL3[2][2] in a step S168, and the subroutine is terminated.

When the final target input rotation speed Ni* is larger than the predetermined value TDREV2, the first torque down correction coefficient KTD1 is set to KTDTBL3[3][1] and the second torque down correction coefficient KTD2 is set to KTDTBL3[3][2] in a step S169, and the subroutine is terminated.

When the torque down has not been requested by the torque down control device in the step S152, the first torque down correction coefficient KTD1 and second torque down correction coefficient KTD2 both set to 1.0 in a step S170, and the subroutine is terminated.

Herein, the predetermined values TDREV1, TDREV2 are both experimental values depending on the vehicle to which this invention is applied. The value given to the first torque down correction coefficient KTD1 is set so that it satisfies the following relations.

$$KTDTBL1[3][1] > KTDTBL1[2][1] > KTDTBL1[1][1] > 1.0$$

$$KTDTBL2[3][1] > KTDTBL2[2][1] > KTDTBL2[1][1] > 1.0$$

$$KTDTBL3[3][1] > KTDTBL3[2][1] > KTDTBL3[1][1] > 1.0$$

The value given to the second torque down correction coefficient KTD2 is set so that it satisfies the following relations.

$$KTDTBL1[3][2] > KTDTBL1[2][2] > KTDTBL1[1][2] > 1.0$$

$$KTDTBL2[3][2] > KTDTBL2[2][2] > KTDTBL2[1][2] > 1.0$$

$$KTDTBL3[3][2] > KTDTBL3[2][2] > KTDTBL3[1][2] > 1.0$$

That is, the first torque down correction coefficient KTD1 and second torque down correction coefficient KTD2 are set so that the response of the speed ratio variation is faster the higher the final target input rotation speed Ni*. A high final target input rotation speed Ni* implies that the engine load is high. Expressed differently, the first torque down correction coefficient KTD1 and second torque down correction coefficient KTD2 are set so that the response of the speed ratio variation is faster the higher the engine load. However, even the correction coefficients for the slowest case are set larger than 1.0 so that the response of the speed ratio variation is faster than the case where a torque down request is not made.

The value given to the first torque down correction coefficient KTD1 is set so that it further satisfies the following relations.

$$KTDTBL2[1][1] > KTDTBL1[1][1] > KTDTBL3[1][1] > 1.0$$

$$KTDTBL2[2][1] > KTDTBL1[2][1] > KTDTBL3[2][1] > 1.0$$

$$KTDTBL2[3][1] > KTDTBL1[3][1] > KTDTBL3[3][1] > 1.0$$

The value given to the second torque down correction coefficient KTD2 is set so that it further satisfies the following relations.

$$KTDTBL2[1][2] > KTDTBL1[1][2] > KTDTBL3[1][2] > 1.0$$

$$KTDTBL2[2][2] > KTDTBL1[2][2] > KTDTBL3[2][2] > 1.0$$

$$KTDTBL2[3][2] > KTDTBL1[3][2] > KTDTBL3[3][2] > 1.0$$

That is, the response of the speed ratio variation is arranged to be the fastest during the large torque down produced by fuel cut when the final target input rotation speed Ni* is the same. When the small torque down due to ignition timing is permitted, the response of the speed ratio variation is intermediate.

When torque down is not permitted, the response of a speed ratio variation is slower than the case where a small torque down is permitted. However, even the correction coefficient for the slowest case is larger than 1.0. In other words, the correction of the time constant gains is performed so that the response of the speed ratio variation when there is a torque down request is faster than in the case where there is no torque down request.

Due to this setting, speed change shock can be particularly reduced in the low engine rotation speed region under heavy engine load.

Next, the subroutine which calculates the first vehicle speed correction coefficient KVSP1 and second vehicle speed correction coefficient KVSP2 will be described referring to FIG. 12.

First, it is determined in a step S171 whether or not the operating mode is the ordinary speed change mode.

This is based on the determination result of the step S96 of the main routine.

In the case of the ordinary speed change mode, it is determined in a step S172 whether the UP/DOWN flag is "UP" or "DOWN".

When the UP/DOWN flag is "UP", it is determined in a step S173 whether or not the foot release flag is 1. When the foot release flag is not 1, it is determined in a step S174 whether or not the depression decrease flag is 1. When the depression decrease flag is not 1, a table VSPTBL1 is selected in a step S175.

When the foot depression decrease is 1 in the step S174, a table VSPTBL2 is selected in a step S176. Further, when the foot release flag is 1 in the step S173, a table VSPTBL3 is selected in a step S177.

On the other hand, when the UP/DOWN flag is "DOWN" in the step S172, it is determined in a step S178 whether or not the rapid depression flag is 1. When the rapid depression flag is not 1, it is determined in a step S179 whether the depression increase flag is 1. When the depression increase flag is not 1, a table VSPTBL4 is selected in a step S180. When the depression increase flag is 1, a table VSPTBL5 is selected in a step S181.

When the rapid depression flag is 1 in the step S178, a table VSPTBL6 is selected in the step S182.

When it was determined that the operating mode was not the ordinary speed change mode in the step S171, tables VSPTBL7–VSPTBL12 are selected by the same process as that of the steps S172–S182 in a step S183 and subsequent steps.

After selecting one of the tables, the first vehicle speed correction coefficient KVSP1 and second vehicle speed correction coefficient KVSP2 are determined in the step S184 based on the vehicle speed VSP by referring to the selected table, and this subroutine is terminated.

In each table, the first vehicle speed correction coefficient KVSP1 and second vehicle speed correction coefficient KVSP2 are set to become smaller as vehicle speed VSP becomes larger. The input rotation speed Ni of the continuously variable transmission is higher, and the variation of the input rotation speed Ni accompanying the variation of speed ratio is also larger at high vehicle speeds than at low vehicle speeds. For this reason, the speed change shock due to a speed change operation of the transmission accompanying depression of the accelerator pedal is larger at high vehicle speeds than at low vehicle speeds.

Hence by making the correction coefficient smaller as the vehicle speed becomes larger as in the above setting, such a torque shock can be mitigated.

The differences between the tables VSPTBL1–VSPTBL12 are set as follows.

The first vehicle speed correction coefficient KVSP1 and second vehicle speed correction coefficient KVSP2 given by each table are made smaller the faster the depression rate of the accelerator pedal for the same vehicle speed VSP. In other words, the first vehicle speed correction coefficient KVSP1 and second vehicle speed correction coefficient KVSP2 are set to their smallest values when the rapid depression flag or foot release flag is 1, are set to their next smallest values when these flags are 0 and the depression increase flag or depression decrease flag is 1, and are set to their largest values when all the flags are 0. Therefore, among VSPTBL1–VSPTBL3, VSPTBL1 gives the largest values to the first vehicle speed correction coefficient KVSP1 and second vehicle speed correction coefficient KVSP2, VSPTBL2 gives the next largest values, and VSPTBL3 gives the smallest values. As for VSPTBL4–VSPTBL6, VSPTBL4 gives the largest values, VSPTBL5 gives the next largest values and VSPTBL6 gives the smallest values. As for VSPTBL7–VSPTBL9, VSPTBL7 gives the largest values, and VSPTBL9 gives the smallest values. As for VSPTBL10–VSPTBL12, VSPTBL10 gives the largest values, and VSPTBL12 gives the smallest values.

The tables used when the operating mode is not the ordinary speed change mode give a larger first vehicle speed correction coefficient KVSP1 and second vehicle speed correction coefficient KVSP2 than the tables used under the same accelerator depression flag in the ordinary speed change mode.

For example, VSPTBL7 gives larger values than VSPTBL1.

When the operating mode is not the ordinary speed change mode, it signifies that the vehicle is running in the power mode, snow mode, or the driver has issued a shift up command or a shift down command in the forward manual speed change running range. In such a case, a high speed ratio variation response is generally desired, so the time constant gain is increased.

In the snow mode, the use of the maximum speed ratio area, for example, is limited. When the vehicle is in the stationary state, the continuously variable transmission cannot modify the speed ratio, so when the snow mode is selected in the stationary state, the speed ratio must be rapidly changed over from the maximum speed ratio area to the other speed ratio area permitted by the snow mode as soon as the vehicle begins to move. The speed ratio variation response is therefore set higher in the snow mode than in the ordinary speed change mode.

However, whichever table is used, the first vehicle speed correction coefficient KVSP1 and second vehicle speed correction coefficient KVSP2 are set to be smaller than 1.0. According to this subroutine, the speed ratio variation rate becomes slower the faster the accelerator pedal depression rate.

Next, the subroutine which calculates the first running state correction coefficient KETC1 and second running state correction coefficient KETC2 will be described referring to FIG. 13.

This subroutine calculates correction coefficients according to the operating state of the anti-skid braking system 320, traction control system 330, and auto cruise system 340.

First, in a step S185, it is determined on the basis of an ABS signal whether or not the anti-skid braking system 320 is operating. When the ABS signal is ON, the subroutine proceeds to a step S186.

Here, it is determined whether or not the operating mode is the ordinary speed change mode. This is based on the determining result of the step S96 of the main routine.

When the mode is not the ordinary speed change mode, the first running state correction coefficient KETC1 is set to KETC[1][1] and the second running state correction coefficient KETC2 is set to KETC[1][2] in a step S187, and the subroutine is terminated.

When the mode is the ordinary speed change mode in the step S186, the first running state correction coefficient KETC1 is set to KETC[2][1] and the second running state correction coefficient KETC2 is set to KETC[2][2] in a step S188, and the subroutine is terminated.

When the ABS signal is OFF in the step S185, it is determined on the basis of a TCS signal whether the traction control system 330 is operating in a step S189.

When the TCS signal is ON, the subroutine proceeds to a step S190.

Here, it is determined whether or not the operating mode is the ordinary speed change mode in the same way as in the step S186.

When the mode is not the ordinary speed change mode, the first running state correction coefficient KETC1 is set to KETC[3][1] and the second running state correction coefficient KETC2 is set to KETC[3][2] in a step S191, and the subroutine is terminated.

When the mode is the ordinary speed change mode in the step S190, the first running state correction coefficient KETC1 is set to KETC[4][1] and the second running state correction coefficient KETC2 is set to KETC[4][2] in a step S192, and the subroutine is terminated.

When the TCS signal is OFF in the step S189, the subroutine proceeds to a step S193.

Here, based on an ASCD signal, it is determined whether or not the auto cruise system 340 is operating.

When the ASCD signal is ON, the first running state correction coefficient KETC1 is set to KETC[5][1], the second running state correction coefficient KETC2 is set to KETC[5][2] in a step S195, and the subroutine is terminated.

When the driver changes over the mode selection switch 70 or operates the SHIFT-UP/SHIFT-DOWN switch 69, the operation of the auto cruise system 340 is forcibly terminated.

Therefore, as long as the ASCD signal is ON, the mode can only be the ordinary speed change mode where such an operation is not performed, and consequently, when the ASCD signal is ON, the determination of whether or not the mode is the ordinary speed change mode is not performed.

On the other hand, when the ASCD signal is OFF in the step S193, the first running state correction coefficient KETC1 and the second running state correction coefficient KETC2 are both set to 1.0 in a step S194, and the subroutine is terminated.

Herein, the values of KETC[1][1]–KETC[5][2] are set as follows.

1.0>KETC[1][1]>KETC[2][1]

1.0>KETC[2][1]>KETC[2][2]

1.0>KETC[3][1]>KETC[4][1]

1.0>KETC[3][2]>KETC[4][2]

1.0>KETC[5][1]

1.0>KETC[5][2]

When the anti-skid braking system 320, the traction control system 330 or the auto cruise system 340 is operating, the speed ratio variation is slowed down by respectively setting the first running state correction coefficient KETC1 and second running state correction coefficient KETC2 to less than 1.0. This is due to the following reason.

When the anti-skid braking system 320 or the traction control system 330 is operating, the vehicle speed largely fluctuates, and the transient target speed ratio is not stable. To stabilize vehicle performance in this state, it is desirable to slow down the variation of speed ratio.

Moreover, if the speed ratio is varied as the auto cruise system 340 varies the throttle opening, oscillation of the speed ratio tends to occur. Therefore, also in such a state, it is desirable to slow down the variation of speed ratio in order to stabilize vehicle performance.

It should be noted that, in a mode other than the ordinary speed change mode, the reason why a larger value is given to the first running state correction coefficient KETC1 and second running state correction coefficient KETC2 than in the ordinary speed change mode, i.e., the reason why the speed change variation response is increased, is that when the mode is not the ordinary speed change mode, the driver desires a variation of speed ratio.

Next, a subroutine which calculates the first accelerator pedal operation correction coefficient KSPC1 and second accelerator pedal operation correction coefficient KSPC2 will be described referring to FIG. 14.

First, it is determined in a step S196 whether or not the rapid depression flag or foot release flag is 1.

If neither of the flags is 1, the first accelerator pedal operation correction coefficient KSPC1 and the second accelerator pedal operation correction coefficient KSPC2 are both set to 1.0 in a step S197. Also, in a step S198, the rapid depression flag, depression increase flag, foot release flag and depression decrease flag are maintained at their values on the immediately preceding occasion when the subroutine was executed, and the subroutine is terminated.

When either the rapid depression flag or foot release flag is 1 in the step S196, it is determined in a step S199 whether or not this determining result is the same as the determining result on the immediately preceding occasion when the subroutine was executed.

When the determining result is the same, the routine proceeds to a step S201. When the determining result is different, the routine proceeds to the step S201 after resetting a timer value QKTIM to 0 in a step S200.

In the step S201, the rapid depression flag, depression increase flag, foot release flag and depression decrease flag on this occasion are stored in a predetermined memory in order to compare with their values on the next occasion when the routine is executed.

In a following step S202, it is determined whether or not the foot release flag is 1. When the foot release flag is 1, it is determined in a step S203 whether or not the input signal from the mode selection switch 70 is ON.

When the output signal of the mode selection switch 70 is OFF, it is determined in a step S204 whether or not the vehicle speed VSP is less than a predetermined speed UPVSP1.

When the vehicle speed VSP is less than the predetermined speed UPVSP1, QUTIM[1] is set to a predetermined time in a step S205. When the vehicle speed VSP is not less than the predetermined speed UPVSP1, the subroutine proceeds to a step S206. In the step S206, it is determined whether or not the vehicle speed VSP is less than another predetermined speed UPVSP2. Herein, the predetermined speed UPVSP2 is a larger value than the predetermined speed UPVSP1.

When the vehicle speed VSP is less than the predetermined speed UPVSP2, QUTIM[2] is set to the predetermined time in a step S207.

When the vehicle speed VSP is not less than the predetermined speed UPVSP2, QUTIM[3] is set to the predetermined time in a step S208.

On the other hand, When the output signal of the mode selection switch 70 is ON in the step S203, the subroutine proceeds to a step S209. Herein, the vehicle speed VSP is compared with the predetermined speed UPVSP1 as in the step S204. When the vehicle speed VSP is less than the predetermined speed UPVSP1, QUTIM[4] is set to the predetermined time in a step S210. When the vehicle speed VSP is not less than the predetermined speed UPVSP1, the subroutine proceeds to a step S211. Here, the vehicle speed VSP is compared with the predetermined speed UPVSP2 as in the step S206. When the vehicle speed VSP is less than the predetermined speed UPVSP2, QUTIM[5] is set to the predetermined time in a step S212.

When the vehicle speed VSP is not less than the predetermined speed UPVSP2, QUTIM[6] is set to the predetermined time in a step S213.

Further, when the foot release flag is not 1 in the step S202, in a step S214 and subsequent steps, the subroutine sets one of QUTIM[7]–QUTIM[12] to the predetermined time by the same process as in the steps S203–S213.

When the foot release flag is not 1 in the step S202, it signifies that the rapid depression flag is 1.

After any of QUTIM[1]–QUTIM[12] is set as the predetermined time in this way, the subroutine proceeds to a step S215.

Herein, it is determined whether or not the timer value QKITIM has reached the predetermined time.

When the timer value QKITIM has not reached the predetermined time, the first accelerator pedal operation correction coefficient KSPC1 is set to KSQUTBL[1][1] and the second accelerator pedal operation correction coefficient KSPC2 is set to KSQUTBL[1][2] in a step S216.

When the timer value QKITIM has reached the predetermined time, the first accelerator pedal operation correction coefficient KSPC1 is set to KSQUTBL[2][1] and the second accelerator pedal operation correction coefficient KSPC2 is set to KSQUTBL[2][2] in a step S217.

After setting the first accelerator pedal operation correction coefficient KSPC1 and second accelerator pedal operation correction coefficient KSPC2 in the step S216 or step S217, the timer value QKITIM is incremented in a step S218, and the subroutine is terminated.

The predetermined speeds UPVSP1 and UPVSP2 are values which are experimentally determined according to the vehicle.

The predetermined times QUTIM[1]–QUTIM[6] are set as follows.

QUTIM[3]>QUTIM[2]>QUTIM[1]

QUTIM[6]>QUTIM[5]>QUTIM[4]

In a mode other than the ordinary speed change mode, the predetermined time is set longer than in the ordinary speed change mode as shown by the following equation.

QUTIM[3]>QUTIM[6]

QUTIM[2]>QUTIM[5]

QUTIM[1]>QUTIM[4]

When the mode is not the ordinary speed change mode, the driver expects a faster speed ratio variation response than in the case than in the ordinary speed change mode.

Due to this setting, the speed change operation is delayed for the predetermined time when the throttle is fully opened, i.e., when the accelerator pedal is rapidly depressed, and as a result the output torque of the continuously variable transmission varies more smoothly compared to the speed change control device of the prior art, as shown in FIGS. 15A–15D.

Also, the speed change operation is delayed for the predetermined time when the throttle is fully closed, i.e., when the accelerator pedal is rapidly released, and as a result the output torque of the continuously variable transmission varies more smoothly compared to the speed change control device of the prior art, as shown in FIGS. 16A–16D.

The contents of Tokugan Hei 10-271191, 10-271192, 10-271193, 10-271194, 10-271195, and 10-271196, with a filing date of Sep. 25, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the aforesaid embodiment, the invention is applied to a toroidal continuously variable transmission, but it can be applied also to a V-belt continuously variable transmission or to a planetary gear-based automatic transmission.

When this invention is applied to the planetary gear-based automatic transmission, a controller should separately control the oil pressure applied to friction elements used for speed ratio variation, such as an oil pressure clutch or oil pressure brake. A gear ratio is thereby controlled under desired time constant gains.

In the aforesaid embodiment, the accelerator depression flags are set according to the deviation Eip between the final target speed ratio i* and a transient target speed ratio RatioO. However, these flags may be set according directly to an accelerator depression speed which can be measured by an accelerator depression sensor known in the art.

The embodiments of this invention in which an exclusive property or privilege is claimed are defined as follows:

What is claimed is:

1. A speed ratio control device for an automatic transmission for a vehicle, comprising:

an actuator which varies a speed ratio of the transmission according to an operating command;

a sensor which detects a running condition of the vehicle; and a microprocessor programmed to:
calculate a final target speed ratio based on the running condition of the vehicle;
set second order delay time constant gains relating to a response rate from the actuator operating command to a variation of a real speed ratio of the transmission;
calculate a transient target speed ratio based on the final target speed ratio and time constant gains; and
output the operating command corresponding to the transient target speed ratio to the actuator.

2. A speed ratio control device as defined in claim 1, wherein the microprocessor is further programmed to calculate the transient target speed ratio, and output the operating command to the actuator repeatedly with a predetermined control interval.

3. A speed ratio control device as defined in claim 2, wherein the microprocessor calculates the transient target speed ratio by the following equation:

$$RatioOO = RatioOO_{-1} + Tg1.$$

$$RatioO = RatioO_{-1} + Tg2.$$

where,

RatioO=transient target speed ratio,

RatioOO=imaginary speed ratio, $RatioO_{-1}$=transient target speed ratio on immediately preceding control occasion, $RatioOO_{-1}$=imaginary speed ratio on immediately preceding control occasion, i*=final target speed ratio, Tg1=first time constant gain, and Tg2=second time constant gain.

4. A speed ratio control device as defined in claim 2, wherein the vehicle comprises an engine and an accelerator pedal which increases and decreases an output torque of the engine, and the microprocessor is further programmed to set the time constant gains so that the response rate is faster the larger an operating speed of the accelerator pedal.

5. A speed ratio control device as defined in claim 4, wherein the microprocessor is further programmed to calculate a deviation of the transient target speed ratio calculated on the immediately preceding control occasion from the final target speed ratio calculated on the present control occasion, and estimate the operating speed of the accelerator pedal by comparing the deviation with a predetermined deviation value.

6. A speed ratio control device as defined in claim 5, wherein the microprocessor is further programmed to determine if the operating speed of the accelerator pedal has increased, set the time constant gains to first values for a predetermined time period from when the operating speed of the accelerator pedal has increased, and set the time constant gains to second values after the predetermined time period has elapsed, the first values making the response rate slower than the second values.

7. A speed ratio control device as defined in claim 6, wherein the control device further comprises a sensor which detects a running speed of the vehicle, and the microprocessor is further programmed to set the predetermined time period longer the larger the running speed of the vehicle.

8. A speed ratio control device as defined in claim 1, wherein the microprocessor is further programmed to calculate each of second order delay time constant gains by multiplying a basic time constant gain by plural correction coefficients.

9. A speed ratio control device as defined in claim 1, wherein the vehicle comprises an engine which has a throttle, and the running condition detection sensor comprises a sensor which detects an opening of the throttle and a sensor which detects a running speed of the vehicle.

10. A speed ratio control device as defined in claim 9, wherein the microprocessor is further programmed to set the time constant gains so that the response rate is faster the larger the opening of the throttle.

11. A speed ratio control device as defined in claim 1, wherein the transmission is arranged to change over an operating range according to an operation by a driver, the speed ratio control device further comprises a sensor which detects a change-over of the operating range, and the microprocessor is further programmed to set the time constant gains so that the response rate is slower when the change-over of operating range is performed than when the change-over of operating range is not performed.

12. A speed ratio control device as defined in claim 1, wherein the vehicle comprises an engine, an engine controller which controls an output torque of the engine and a torque down system which requests the engine controller to decrease the output torque of the engine to reduce a shock due to a speed ratio variation of the transmission, the speed ratio control device further comprises a sensor which detects that the torque down system is requesting a decrease of the output torque of the engine, and the microprocessor is further programmed to set the time constant gains so that the response rate is faster when the decrease of the output torque of the engine is requested than when the decrease of the output torque of the engine is not requested.

13. A speed ratio control device as defined in claim 12, wherein the microprocessor is further programmed to calculate a load of the engine, and set the time constant gains so that the response rate is faster the larger the load.

14. A speed ratio control device as defined in claim 12, wherein the engine controller is arranged to determine a decrease amount of the output torque of the engine when there is a request to decrease the output torque of the engine, and the microprocessor is further programmed to set the time constant gains so that the response rate is faster the larger the decrease amount.

15. A speed ratio control device as defined in claim 1, wherein the vehicle comprises an antilock brake system, the continuously variable transmission further comprises a sensor which detects that the antilock brake system is operating, and the microprocessor is further programmed to set the time constant gains so that the response rate is slower when the antilock brake system is operating than when the antilock brake system is not operating.

16. A speed ratio control device as defined in claim 1, wherein the vehicle comprises a traction control system, the continuously variable transmission further comprises a sensor which detects that the traction control system is operating, and the microprocessor is further programmed to set the time constant gains so that the response rate is slower when the traction control system is operating than when the traction control system is not operating.

17. A speed ratio control device as defined in claim 1, wherein the vehicle comprises an auto cruise system, the continuously variable transmission further comprises a sensor which detects that the auto cruise system is operating, and the microprocessor is further programmed to set the time constant gains so that the response rate is slower when the auto cruise system is operating than when the auto cruise system is not operating.

18. A speed ratio control device as defined in claim 1, wherein the speed ratio control device further comprises a sensor which detects a running speed of the vehicle, and the microprocessor is further programmed to set the time constant gains so that the response rate is slower the faster the running speed.

19. A speed ratio control device as defined in claim 1, wherein the continuously variable transmission comprises a switch for changing over between an ordinary speed change mode for varying the speed ratio based on the vehicle running condition and a non-ordinary speed change mode for varying the speed ratio according to a driver operation, and the microprocessor is further programmed to determine whether or not the continuously variable transmission is in the ordinary speed change mode, and to set the time constant gains so that the response rate is slower when the transmission is in the ordinary operating mode than when the transmission is not in the ordinary operating mode.

20. A speed ratio control device for an automatic transmission for a vehicle, comprising:

means for varying a speed ratio of the transmission according to an operating command;

means for detecting a running condition of the vehicle;

means for calculating a final target speed ratio based on the running condition of the vehicle;

means for setting second order delay time constant gains relating to a response rate from the actuator operating command to a variation of a real speed ratio of the transmission;

means for calculating a transient target speed ratio based on the final target speed ratio and time constant gains; and means for outputting the operating command corresponding to the transient target speed ratio to the actuator.

21. A speed ratio control method of an automatic transmission for a vehicle, the transmission comprising an actuator which varies a speed ratio of the transmission according to an operating command, the method comprising:

detecting a running condition of the vehicle;

calculating a final target speed ratio based on the running condition of the vehicle;

setting second order delay time constant gains relating to a response rate from the actuator operating command to a variation of a real speed ratio of the transmission;

calculating a transient target speed ratio based on the final speed ratio and time constant gains; and outputting the operating command corresponding to the transient target speed ratio to the actuator.

* * * * *